US012054084B2

(12) United States Patent
Harmon et al.

(10) Patent No.: US 12,054,084 B2
(45) Date of Patent: Aug. 6, 2024

(54) INTERIOR SYSTEM OF A VEHICLE

(71) Applicant: Ford Global Technologies, LLC, Dearborn, MI (US)

(72) Inventors: Michael John Harmon, Westland, MI (US); Ryan Wayne Warner, Ann Arbor, MI (US); Jesse Rene Diephuis, West Bloomfield, MI (US); Andrew Brand, Bloomfield Township, MI (US); Andrew Smith, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 17/490,485

(22) Filed: Sep. 30, 2021

(65) Prior Publication Data
US 2023/0099512 A1  Mar. 30, 2023

(51) Int. Cl.
*B60N 3/06* (2006.01)
*B60K 26/02* (2006.01)
*B60T 7/04* (2006.01)

(52) U.S. Cl.
CPC ............ *B60N 3/06* (2013.01); *B60K 26/02* (2013.01); *B60T 7/04* (2013.01); *B60K 2026/026* (2013.01)

(58) Field of Classification Search
CPC .... B60N 3/06; B60K 26/02; B60K 2026/026; B60T 7/04
USPC ........................................................ 296/75
See application file for complete search history.

(56) References Cited

U.S. PATENT DOCUMENTS

| | | | |
|---|---|---|---|
| 6,189,964 B1 | 2/2001 | Henshaw et al. | |
| 6,241,301 B1* | 6/2001 | Speth ................. | B60N 2/02246 180/90.6 |
| 6,318,785 B1 | 11/2001 | Tousignant | |
| 6,527,327 B2* | 3/2003 | Gaus ..................... | B60N 2/995 297/423.44 |
| 8,770,616 B1 | 7/2014 | Draper et al. | |
| 8,899,623 B2 | 12/2014 | Stadler et al. | |
| 9,963,035 B2 | 5/2018 | El Aile et al. | |

(Continued)

FOREIGN PATENT DOCUMENTS

| | | | | |
|---|---|---|---|---|
| CN | 203557981 U | * | 4/2014 | ............. B60N 3/063 |
| DE | 102018211852 B4 | | 3/2020 | |

(Continued)

OTHER PUBLICATIONS

JP-2016196225-A (Soichiro et al.) (Nov. 24, 2016) (Machine Translation) (Year: 2016).*

(Continued)

*Primary Examiner* — Mahmoud Gimie
(74) *Attorney, Agent, or Firm* — Vichit Chea; Price Heneveld LLP

(57) ABSTRACT

A vehicle includes a dashboard having an underside that extends over a foot well, a floor having a base portion and an inclined portion that at least partially defines the foot well and extends vehicle-upward and vehicle-forward from the base portion beneath the dashboard, a seating assembly that corresponds with the foot well and includes a seat base and a seatback, and a foot rest positioned vehicle-upward of the inclined portion of the floor and having an upper support surface configured to support the feet of an occupant of the seating assembly. The foot rest is at least one of positioned within the foot well and at least partially defining the foot well.

18 Claims, 16 Drawing Sheets

(56) References Cited

U.S. PATENT DOCUMENTS

| | | |
|---|---|---|
| 10,427,705 B2 | 10/2019 | Cao et al. |
| 10,457,314 B2 | 10/2019 | Swamidason |
| 10,471,857 B2 | 11/2019 | Woodhouse et al. |
| 10,583,740 B2 | 3/2020 | Ory |
| 10,889,226 B1 | 1/2021 | Dean et al. |
| 11,613,295 B1 * | 3/2023 | Harmon .................. B60N 2/20 280/775 |
| 2019/0084609 A1 | 3/2019 | Rogers |
| 2019/0241205 A1 | 8/2019 | Toyama et al. |
| 2019/0263645 A1 * | 8/2019 | Ewald ...................... B60N 2/38 |
| 2020/0198684 A1 | 6/2020 | Murray et al. |
| 2021/0170988 A1 | 6/2021 | Villalva Sanchez et al. |

FOREIGN PATENT DOCUMENTS

| | | |
|---|---|---|
| DE | 102019201074 A1 | 7/2020 |
| GB | 2457244 A | 8/2009 |
| JP | 2016196225 A * | 11/2016 |
| KR | 19970039985 A | 7/1997 |
| KR | 20170000013 A | 1/2017 |
| KR | 20170137427 A | 12/2017 |
| WO | 2019007840 A1 | 1/2019 |

OTHER PUBLICATIONS

Commonly assigned co-pending U.S. Appl. No. 17/087,342, filed Nov. 2, 2020, including filing receipt, application, and drawings.

* cited by examiner

INTERIOR SYSTEM OF A VEHICLE

FIELD OF THE DISCLOSURE

The present disclosure generally relates to a vehicle. More specifically, the present disclosure generally relates to an interior system of the vehicle.

BACKGROUND OF THE DISCLOSURE

Vehicles typically include a steering wheel and foot pedals that are used in operation. The steering wheel and foot pedals take up space within vehicle interiors.

SUMMARY OF THE DISCLOSURE

According to a first aspect of the present disclosure, a vehicle includes a dashboard, a floor, a seating assembly, and a foot rest. The dashboard has an underside that extends over a foot well. The floor has a base portion and an inclined portion that at least partially defines the foot well and extends vehicle-upward and vehicle-forward from the base portion beneath the dashboard. The seating assembly corresponds with the foot well and includes a seat base having an upper seat base surface positioned to support a seated occupant. The upper seat base surface is positioned vehicle-downward of the underside of the dashboard. The seating assembly also includes a seatback operable to pivot relative to the seat base between an upright position and a reclined position. The foot rest is positioned vehicle-upward of the inclined portion of the floor and has an upper support surface configured to support the feet of an occupant of the seating assembly. The foot rest is at least one of positioned within the foot well and at least partially defining the foot well.

Embodiments of the first aspect of the present disclosure can include any one or a combination of the following features:
- the upper support surface of the foot rest is substantially parallel with the base portion of the floor;
- the floor further includes a shelf portion extending vehicle-forward from the inclined portion, wherein the foot rest comprises the shelf;
- the foot rest is operable to pivot within the foot well between a foot rest stowed position and a foot rest use position;
- the upper support surface of the foot rest faces vehicle-forward in the foot rest stowed position and vehicle-upward in the foot rest use position;
- a portion of the floor vehicle-upward and vehicle-forward of the base portion defines a foot rest recess, and the foot rest is at least partially received within the foot rest recess in the foot rest stowed position;
- the upper support surface of the foot rest faces vehicle-rearward in the foot rest stowed position and vehicle-upward in the foot rest use position;
- a foot pedal within the foot well and operable between a foot pedal use position and a foot pedal stowed position;
- the foot pedal is vehicle-downward of the foot rest in the foot pedal stowed position;
- the foot pedal is vehicle-upward of the foot rest in the foot pedal stowed position; and
- the foot pedal is operable to pivot between the foot pedal use and stowed positions, and the foot rest is operable to pivot between the foot rest use and stowed positions.

According to a second aspect of the present disclosure, a vehicle includes a dashboard, a foot well beneath the dashboard, and a foot rest having an upper support surface for supporting a foot of a user. The foot rest is positioned beneath the dashboard and operable to pivot between a foot rest use position and a foot rest stowed position. The foot rest extends further in a vehicle-rearward direction in the foot rest use position than in the foot rest stowed position.

Embodiments of the second aspect of the present disclosure can include any one or a combination of the following features:
- the upper support surface of the foot rest faces vehicle-forward in the foot rest stowed position and vehicle-upward in the foot rest use position;
- the upper support surface of the foot rest faces vehicle-rearward in the foot rest stowed position and vehicle-upward in the foot rest use position;
- a floor having a base portion, wherein the base portion is substantially parallel to the upper support surface of the foot rest in the foot rest use position; and
- a seating assembly that corresponds with the foot well, including a seat base having an upper seat base surface, and a seatback that is pivotable relative to the seat base between an upright position and a reclined position, wherein, in the foot rest use position of the foot rest and the reclined position of the seatback, the seating assembly and foot rest provide support for the user in a supine position.

According to a third aspect of the present disclosure, a vehicle includes a dashboard having an underside that extends over a foot well and a floor. The floor includes a base portion, an inclined portion within the foot well that extends vehicle-upward and vehicle-forward from the base portion beneath the dashboard, and a shelf portion that extends vehicle-forward from the inclined portion to form a foot rest. The shelf portion is substantially parallel with the base portion.

Embodiments of a third aspect of the present disclosure can include any one or a combination of the following features:
- a seating assembly that corresponds with the foot well, including a seat base having an upper seat base surface positioned to support a seated occupant, wherein the upper seat base surface is positioned vehicle-downward of the underside of the dashboard, and a seatback operable to pivot relative to the seat base between an upright position and a reclined position;
- a brake pedal positioned within the foot well, and an accelerator pedal positioned within the foot well; and
- the shelf portion extends vehicle-laterally-inboard from a laterally-outboard end to a laterally-inboard end, wherein the brake and accelerator pedals are vehicle-laterally-inboard of the laterally-outboard end and vehicle-laterally-outboard of the laterally-inboard end.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
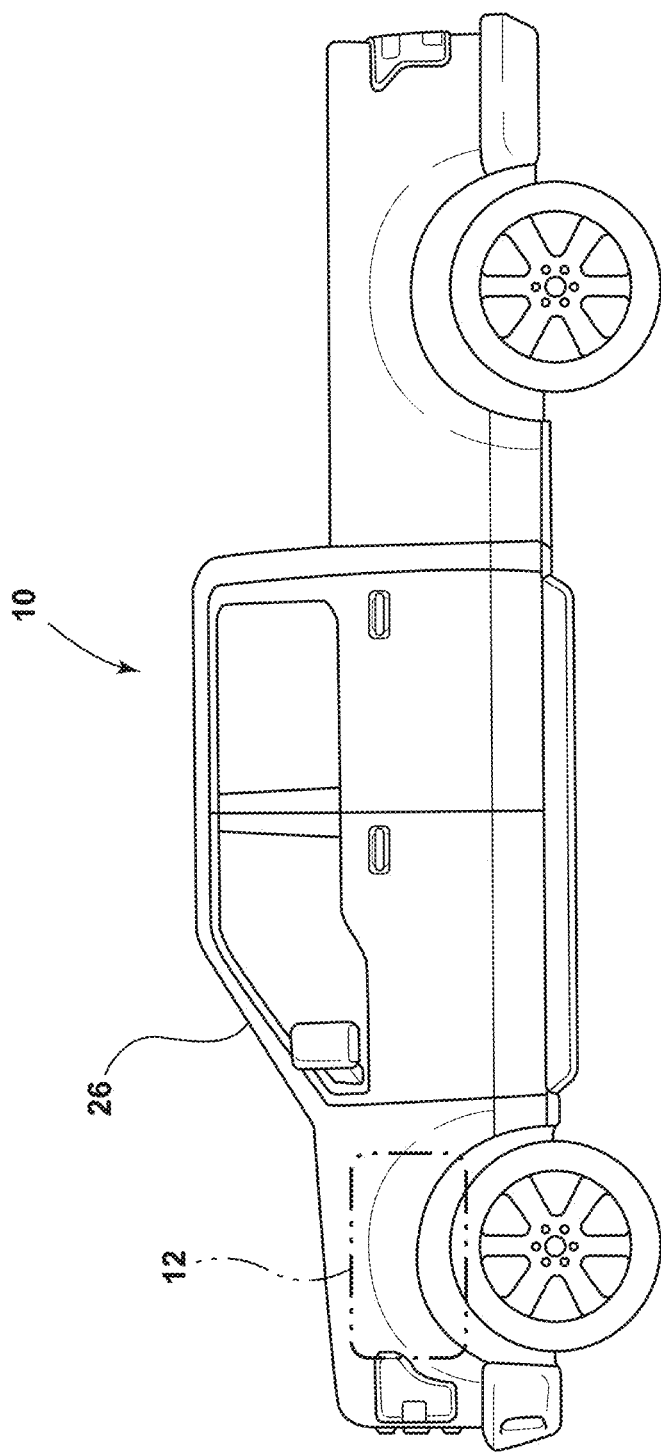
FIG. 1 is a side elevation view of a vehicle, according to one embodiment.

Referring now to FIGS. 1-16, a vehicle 10 is disclosed. The vehicle 10 may be a variety of types of vehicles (e.g., sedan, pickup truck, SUV, crossover, van, etc.). In the embodiment illustrated in FIG. 1, the vehicle 10 is a pickup truck. In some embodiments, the vehicle 10 may include an internal combustion engine that propels the vehicle 10. In some embodiments, the vehicle 10 may be an electric vehicle that is propelled by one or more electric motors. In some embodiments, wherein the vehicle 10 is an electric vehicle, the vehicle 10 may include a front trunk 12, as illustrated in FIG. 1. It is contemplated that the vehicle 10 may be propelled by a variety of power sources, in various embodiments (e.g., hybrid gas and electric, hydrogen fuel cell, etc.).

Referring now to FIGS. 2-6, the vehicle 10 includes a vehicle interior 14. The vehicle interior 14 includes a floor 16. A dashboard 18 may be positioned within the vehicle interior 14 at a vehicle-forward end of the vehicle interior 14. The dashboard 18 may include an underside 20. The underside 20 of the dashboard 18 may face the floor 16 of the vehicle 10, in various embodiments. In some embodiments, the dashboard 18 may extend above a foot well 22 of the vehicle 10, as described further herein. The dashboard 18 may include a top side 24 that is opposite of the underside 20 of the dashboard 18. The top side 24 may be adjacent to a windshield 26 of the vehicle 10, in various embodiments.

Referring now to FIGS. 2-5, in various embodiments, the dashboard 18 may include a housing 28. The housing 28 may be positioned between the top side 24 and the underside 20 of the dashboard 18. The housing 28 may define a receiving space 30. In some embodiments, the housing 28 may receive at least a portion of a steering wheel support assembly 32 therein, as described further herein.

Referring still to FIGS. 2-5, in various embodiments, the vehicle 10 may include a steering control system 34. The steering control system 34 may be operated by a user U of the vehicle 10 to steer the vehicle 10, in some implementations. In various embodiments, the steering control system 34 may include the aforementioned steering wheel support assembly 32 and a steering wheel 36 that is operably coupled to the steering wheel support assembly 32. As described further herein, in some embodiments, the steering control system 34 may be operable between a use configuration and a stowed configuration.

Figure 2:
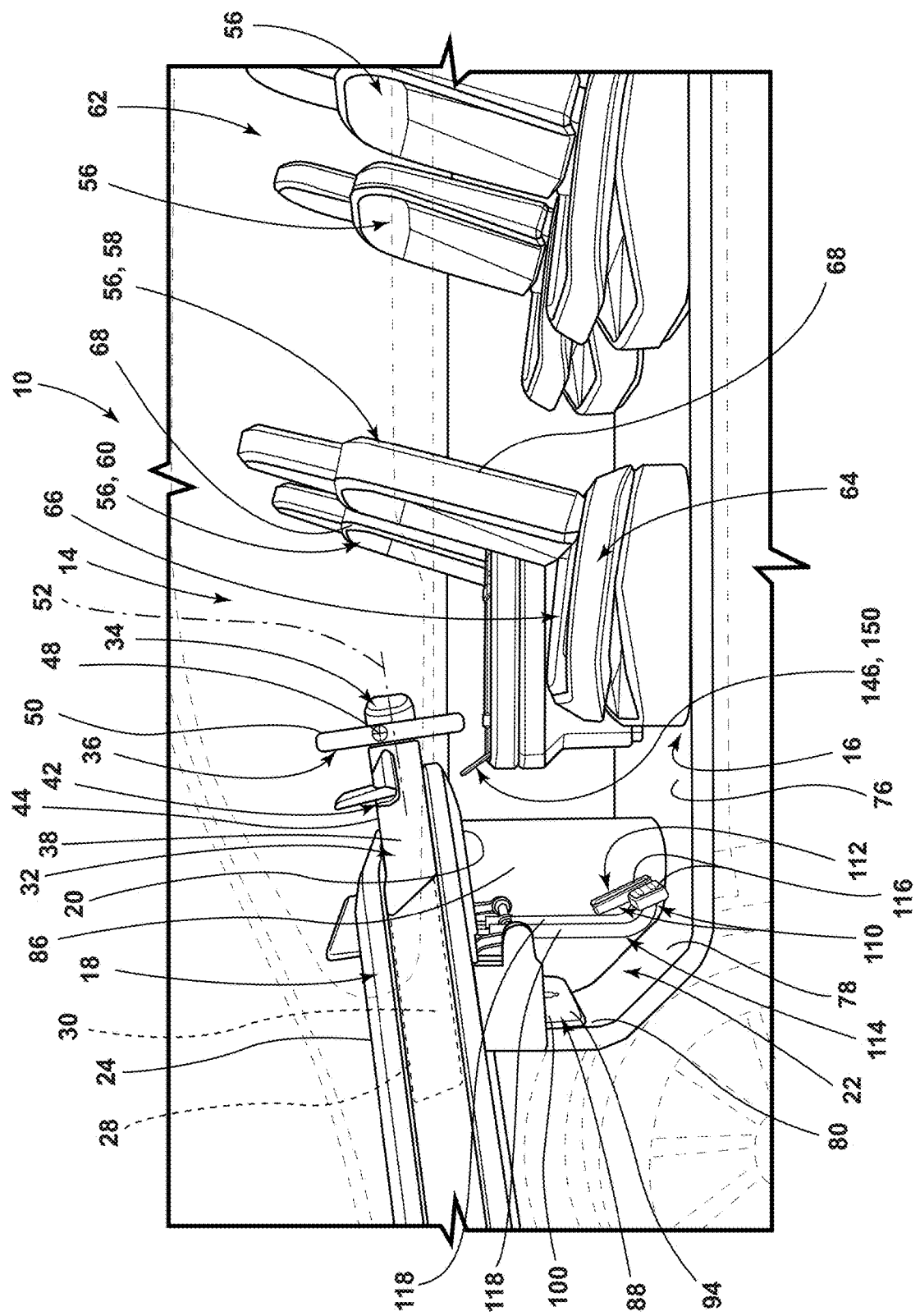
FIG. 2 is a side perspective view of a vehicle interior, illustrating a steering wheel in a steering wheel use position, a steering wheel support assembly in an extended position, a foot pedal in a foot pedal use position, and a foot rest in a foot rest stowed position, according to one embodiment.

Referring still to FIGS. 2-5, the steering wheel support assembly 32 may be operably coupled to the dashboard 18 and configured to support the steering wheel 36 of the vehicle 10. In some implementations, the steering wheel support assembly 32 may extend vehicle-rearward from the dashboard 18, as illustrated in FIG. 2. In various embodiments, the steering wheel support assembly 32 may include a variety of components. For example, in some embodiments, the steering wheel support assembly 32 may include a steering column that provides a physical connection between the steering wheel 36 of the vehicle 10 and the steered wheels of the vehicle 10. In some embodiments, the vehicle 10 may be a steer-by-wire vehicle that does not include a traditional steering column. In such embodiments, the steering wheel support assembly 32 may include one or more sensors and/or an actuator for causing the steered wheels of the vehicle 10 to steer in accordance with the position of the steering wheel 36 sensed by the one or more sensors. Various embodiments are contemplated.

As illustrated in FIG. 2, the steering wheel support assembly 32 includes a trim component 38. The trim component 38 may form the exterior surface of the steering wheel support assembly 32. In some embodiments, the steering wheel support assembly 32 may include multiple trim components 38 that cooperate to form the exterior surface of the steering wheel support assembly 32. The one or more trim components 38 of the steering wheel support assembly 32 may generally conceal other components of the steering wheel support assembly 32 (e.g., steering column, sensors, etc.) from view. As described further herein, in some embodiments, the steering wheel support assembly 32 may include a steering wheel support assembly actuator 40 that is configured to move the steering wheel support assembly 32 relative to the dashboard 18.

Figure 3:
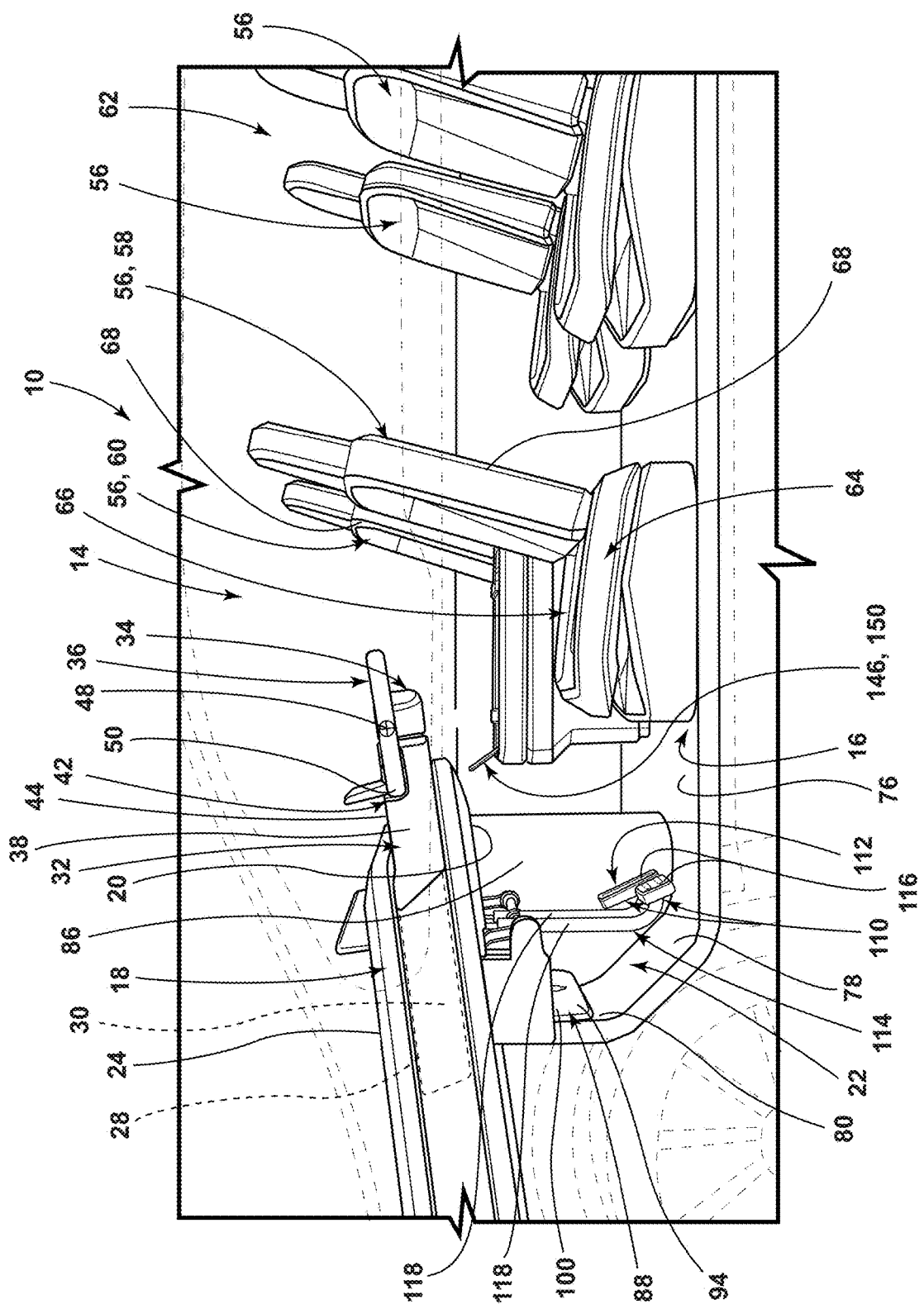
FIG. 3 is a side perspective view of the vehicle interior, illustrating the steering wheel in the steering wheel stowed position, according to one embodiment.
Figure 4:
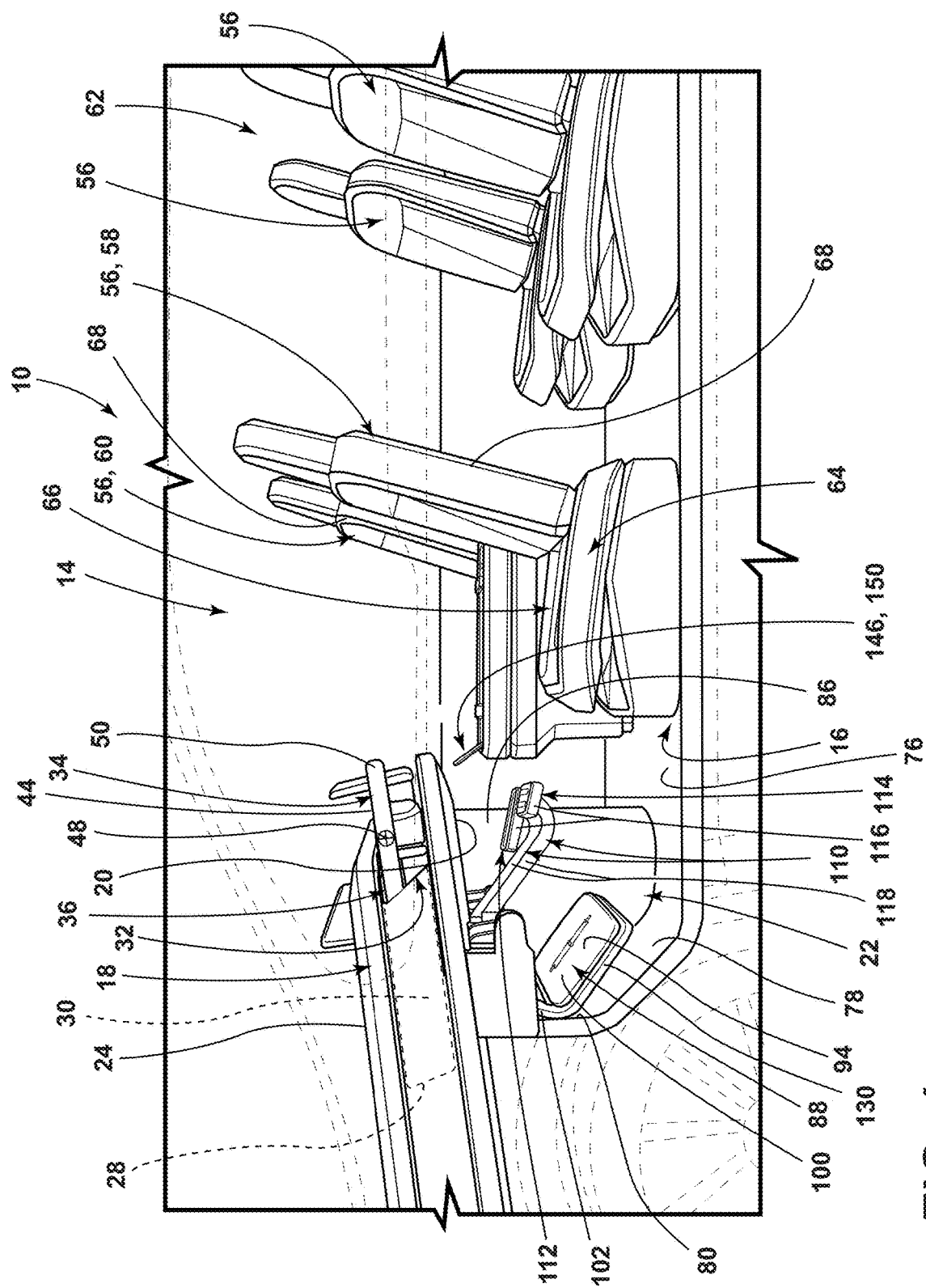
FIG. 4 is a side perspective view of the vehicle interior, illustrating the steering wheel in the steering wheel stowed position, the steering wheel support assembly between the extended position and a retracted position, the foot pedal between the foot pedal use position and a foot pedal stowed position, and the foot rest between the foot rest stowed position and a foot rest use position, according to one embodiment.

Referring now to FIGS. 2 and 3, in some embodiments, the trim component 38 of the steering wheel support assembly 32 may define a trough 42. The trough 42 may be defined on an upper side 44 of the trim component 38, as illustrated in FIG. 2. In various embodiments, the trough 42 defined by the trim component 38 may face generally vehicle-upward. In some examples, the trough 42 may be arcuate in shape. As described further herein, the trough 42 may receive a portion of the steering wheel 36 coupled to the steering wheel support assembly 32 therein, as illustrated in FIG. 3.

In some embodiments, the steering wheel support assembly 32 may be operable between a retracted position and an extended position. The steering wheel support assembly 32 may move relative to the dashboard 18 between the retracted and extended positions. In some embodiments, the position of the steering wheel 36 coupled to the steering wheel support assembly 32 in the extended position of the steering wheel support assembly 32 may be vehicle-rearward of the position of the steering wheel 36 coupled to the steering wheel support assembly 32 in the retracted position of the steering wheel support assembly 32. For example, the position of the steering wheel 36 illustrated in FIG. 2, wherein the steering wheel support assembly 32 is in the extended position, is vehicle-rearward of the position of the steering wheel 36 illustrated in FIG. 5, wherein the steering wheel support assembly 32 is in the retracted position. As described further herein, in some embodiments, the steering wheel support assembly 32 may translate between the retracted and extended positions.

Figure 5:
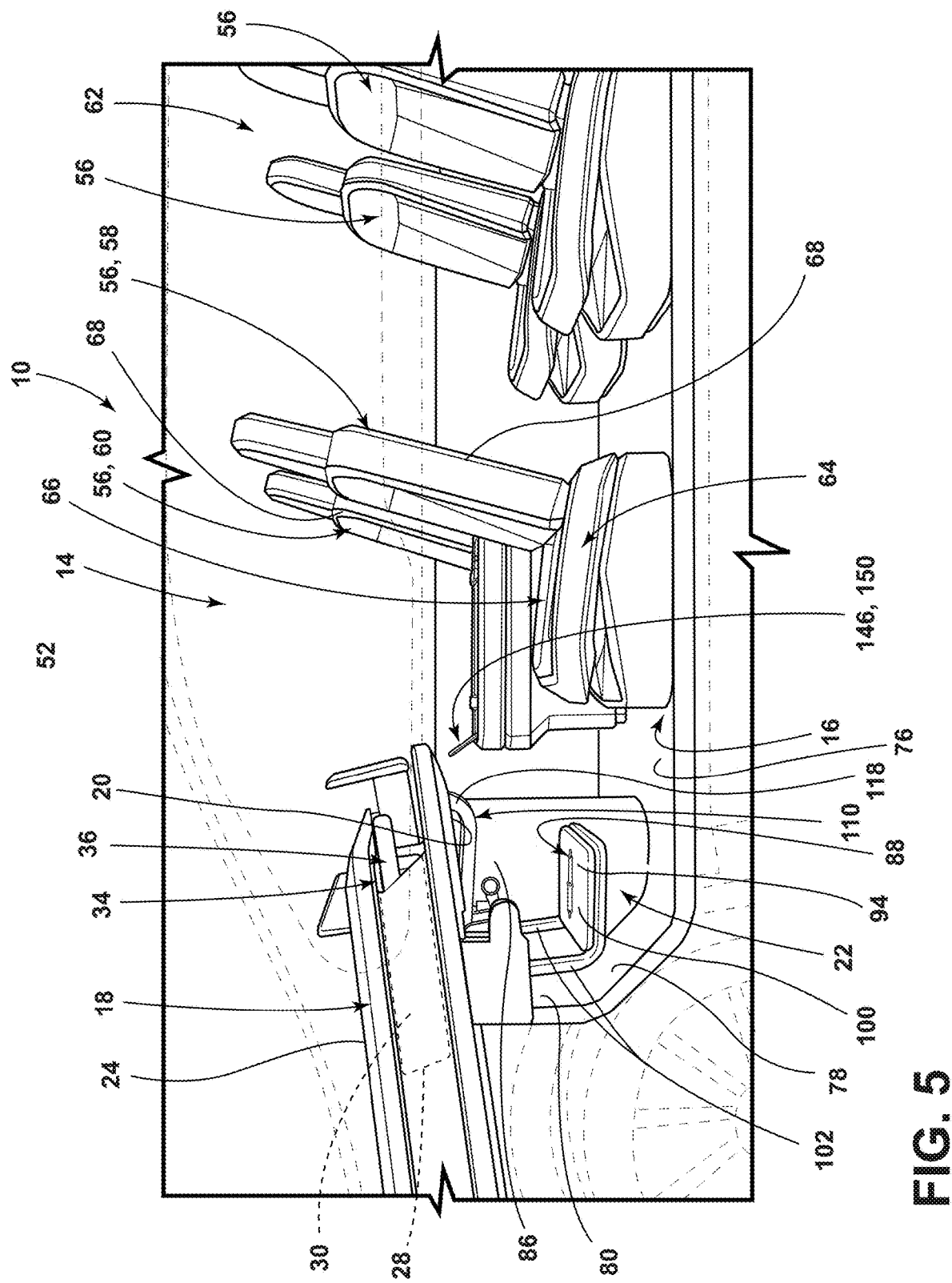
FIG. 5 is a side perspective view of the vehicle interior, illustrating the steering wheel in the steering wheel stowed position, the steering wheel support assembly in the retracted position, the foot pedal in the foot pedal stowed position, and the foot rest in the foot rest use position, according to one embodiment.

Referring now to FIGS. 2-5, in some embodiments, the steering wheel support assembly 32 may protrude out of the housing 28 in the extended position, and the steering wheel support assembly 32 may be received within the housing 28 of the dashboard 18 in the retracted position. For example, the steering wheel support assembly 32 may be received within the receiving space 30 defined by the housing 28 of the dashboard 18 in the retracted position, as illustrated in FIG. 5, and the steering wheel support assembly 32 may translate vehicle-rearward from the retracted position to the extended position, as illustrated in FIGS. 2 and 3. It is contemplated that the steering wheel support assembly 32 may translate between the retracted and extended positions in a variety of manners (e.g., sliding, telescoping, etc.), in various embodiments. It is further contemplated that the steering wheel support assembly 32 may move between the retracted and extended positions in a variety of other ways, in some embodiments (e.g., pivoting, furling, etc.).

Figure 9:
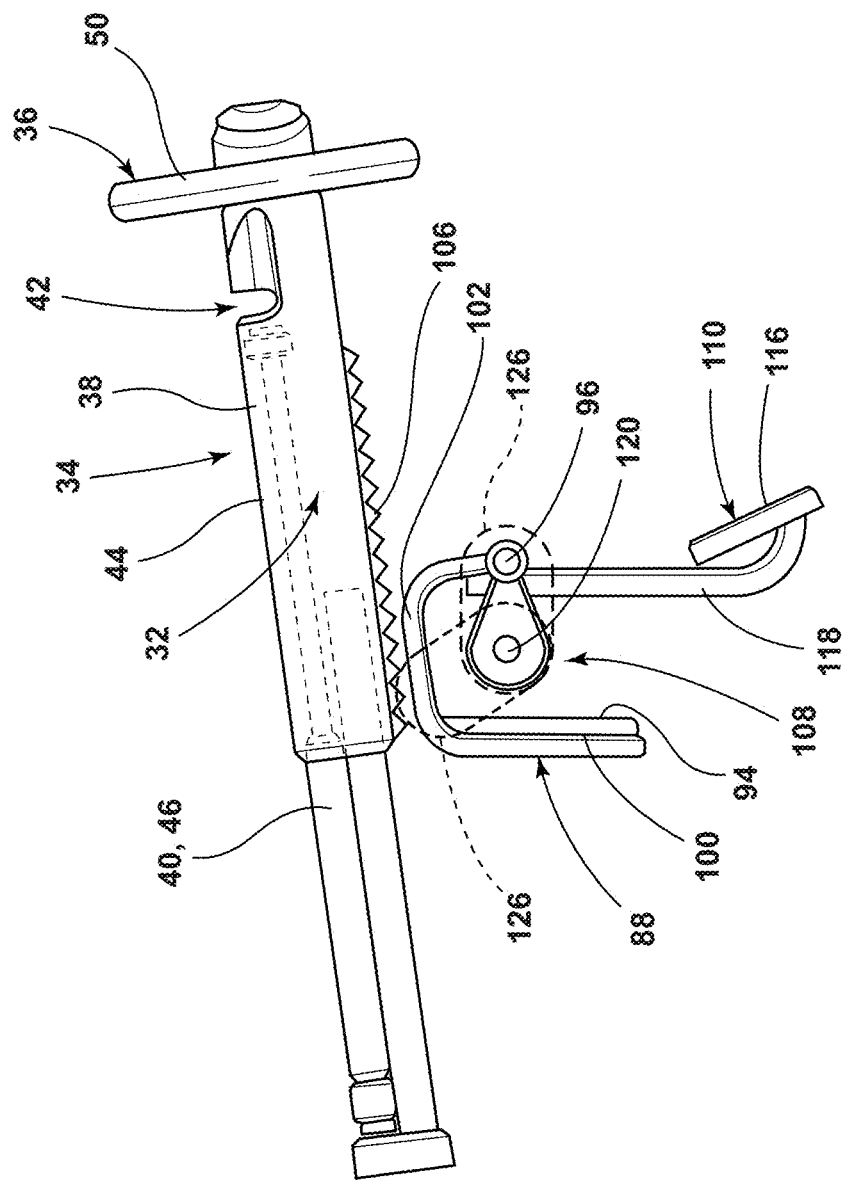
FIG. 9 is an isolated view of a portion of a vehicle interior system that includes a linear actuator, the foot rest, the foot pedal, the steering wheel support assembly, and the steering wheel, according to one embodiment.
Figure 10:
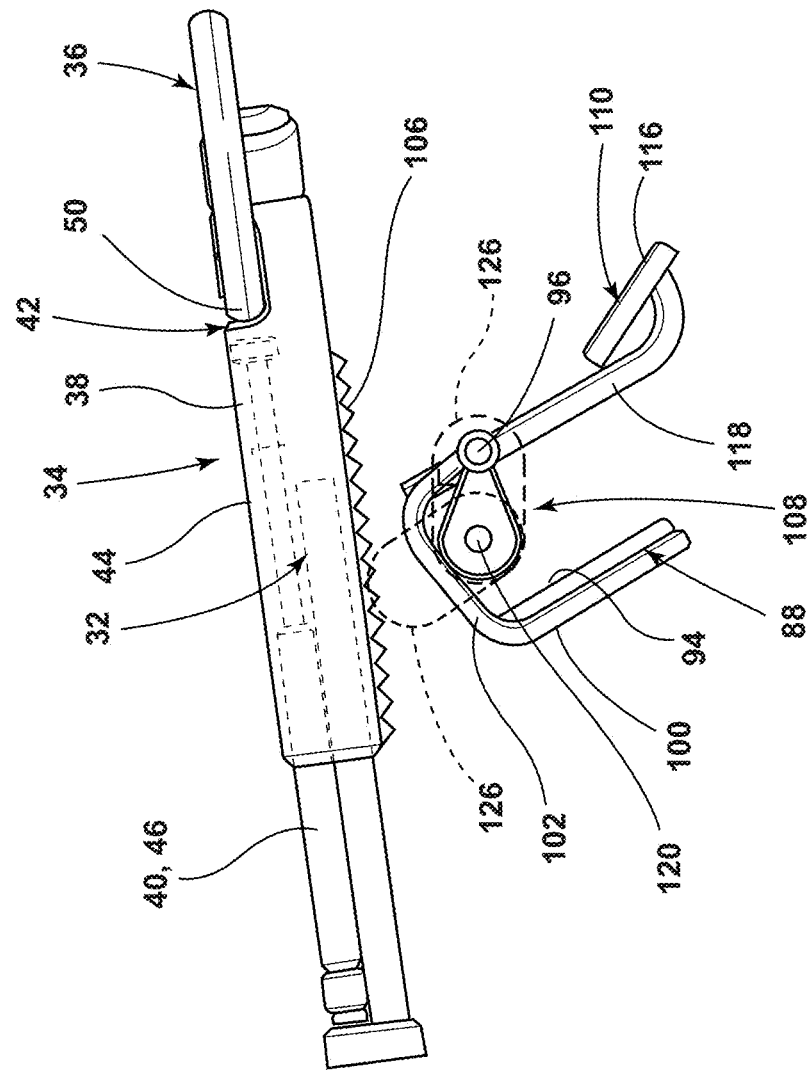
FIG. 10 is an isolated view of a portion of a vehicle interior system that includes a linear actuator, the foot rest, the foot pedal, the steering wheel support assembly, and the steering wheel, according to one embodiment.
Figure 11:
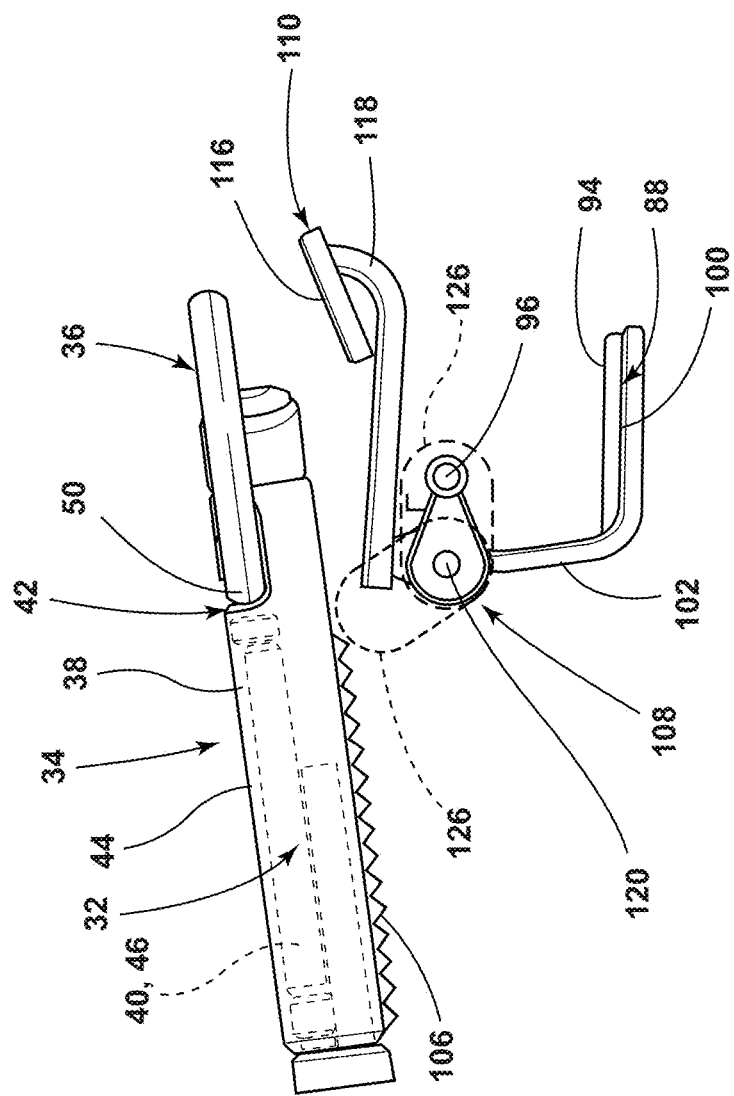
FIG. 11 is an isolated view of a portion of a vehicle interior system that includes a linear actuator, the foot rest, the foot pedal, the steering wheel support assembly, and the steering wheel, according to one embodiment.

Referring now to FIGS. 9-11, in various embodiments, the vehicle 10 may include the steering wheel support assembly actuator 40 that is configured to propel the steering wheel support assembly 32 between the retracted and extended positions. The steering wheel support assembly actuator 40 may include at least one of a variety of types of actuators operable to move the steering wheel support assembly 32 between the retracted and extended positions. In some embodiments, the steering wheel support assembly actuator 40 is a linear actuator 46 that is configured to actuate to translate the steering wheel support assembly 32 between the retracted and extended positions. For example, as illustrated in FIGS. 9-11, the linear actuator 46 is coupled to the steering wheel support assembly 32 and is configured to move the steering wheel support assembly 32 between the extended position, as illustrated in FIG. 9, and the retracted position, as illustrated in FIG. 11. Various types of linear actuators 46 are contemplated (e.g., piston, solenoid, etc.).

Figure 8:
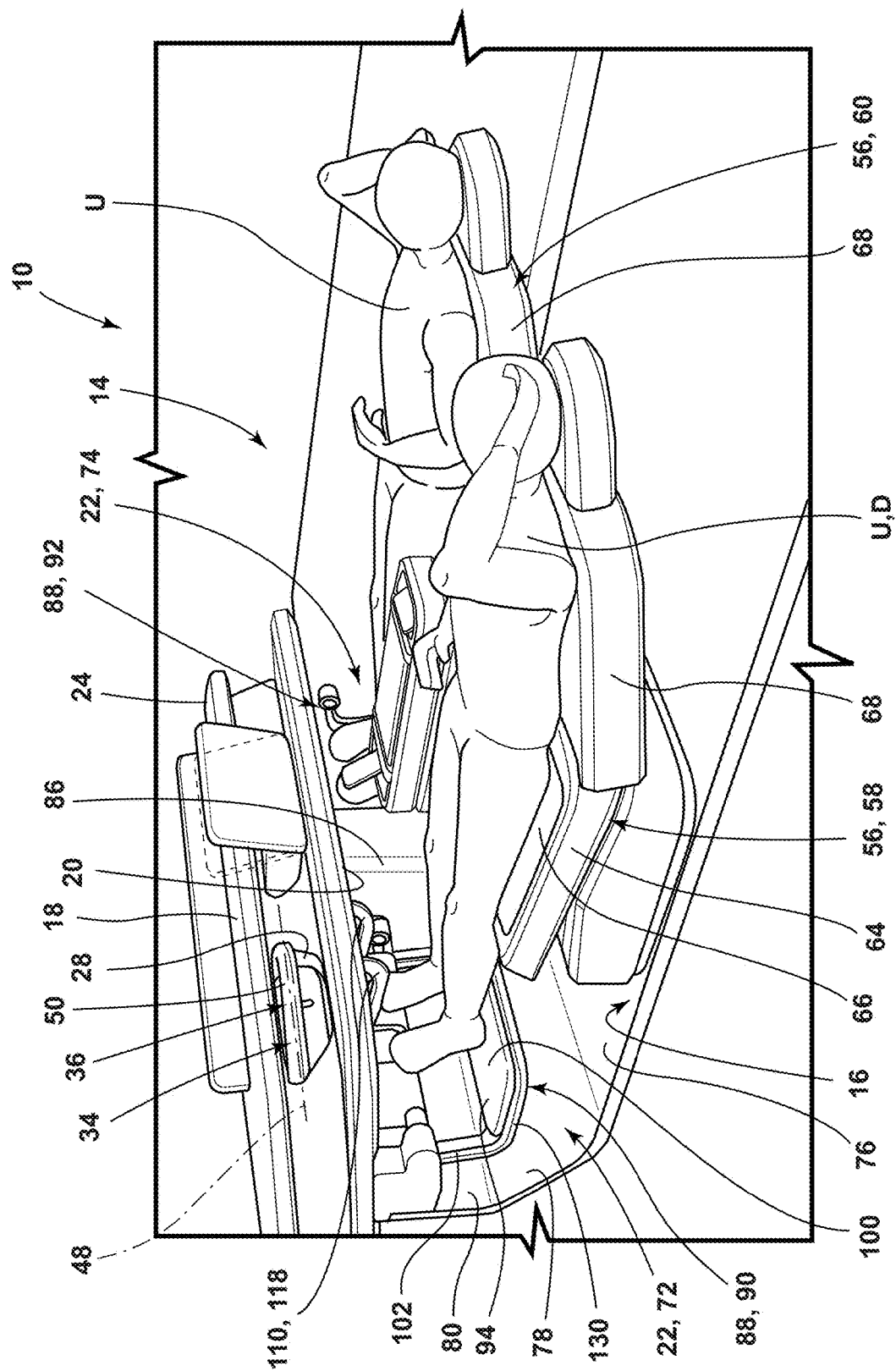
FIG. 8 is an upper perspective view of the vehicle interior, illustrating two users of the vehicle lying in supine positions with their feet resting upon foot rests disposed within respective foot wells of the vehicle, according to one embodiment.

Referring now to FIGS. 2-5, in various embodiments, the steering wheel 36 is operably coupled to the steering wheel support assembly 32. The steering wheel 36 is generally configured to rotate relative to the steering wheel support assembly 32 to steer the vehicle 10. In some embodiments, the steering wheel 36 is movable between a steering wheel use position and a steering wheel stowed position. The steering wheel 36 may be movable relative to the steering wheel support assembly 32 between the steering wheel use and stowed positions. In some implementations, the steering wheel 36 may be operable to pivot relative to the steering wheel support assembly 32 about a first axis 48 between the steering wheel use position and the steering wheel stowed position. The first axis 48 may extend substantially vehicle-laterally, as illustrated in FIG. 8.

Referring now to FIGS. 2 and 3, in various embodiments, a portion of the steering wheel 36 faces vehicle-rearward in the steering wheel use position of the steering wheel 36 and faces vehicle-upward in the steering wheel stowed position of the steering wheel 36. For example, the portion of a circumferential rim 50 of the steering wheel 36 that faces vehicle-rearward away from the dashboard 18 in the steering wheel use position, as illustrated in FIG. 2, faces vehicle-upward after the steering wheel 36 pivots about 90° about the substantially vehicle-lateral first axis 48 to the steering wheel stowed position, as illustrated in FIG. 3. It is contemplated that the steering wheel 36 may pivot various directions about the first axis 48 from the steering wheel use position to the steering wheel stowed position such that the portion of the steering wheel 36 that faces vehicle-rearward in the steering wheel use position may face one or more of a variety of vehicle directions in the steering wheel stowed position (e.g., vehicle-downward, vehicle-laterally, etc.).

As illustrated in FIG. 2, in the steering wheel use position, the steering wheel 36 is operable to steer the vehicle 10 via pivotal movement of the steering wheel 36 about a second axis 52. The second axis 52 may be substantially perpendicular to the first axis 48, in some embodiments. In some implementations, the second axis 52 may extend generally vehicle-longitudinally.

Referring now to FIG. 3, in the steering wheel stowed position, a portion of the steering wheel 36 may be received within the trough 42 defined by the trim component 38 of the steering wheel support assembly 32. In the embodiment illustrated in FIG. 2, a portion of the circumferential rim 50 of the steering wheel 36 is configured to be received within the generally arcuate trough 42 defined by the trim component 38 of the steering wheel support assembly 32. As illustrated, the portion of the steering wheel 36 is received within the generally vehicle-upward facing trough 42 defined by the trim component 38 of the steering wheel support assembly 32. It is contemplated that the trough 42 may face one or more of a variety of vehicle directions corresponding with the position of the steering wheel portion that is configured to be received within the trough 42 in the steering wheel stowed position.

Figure 15:
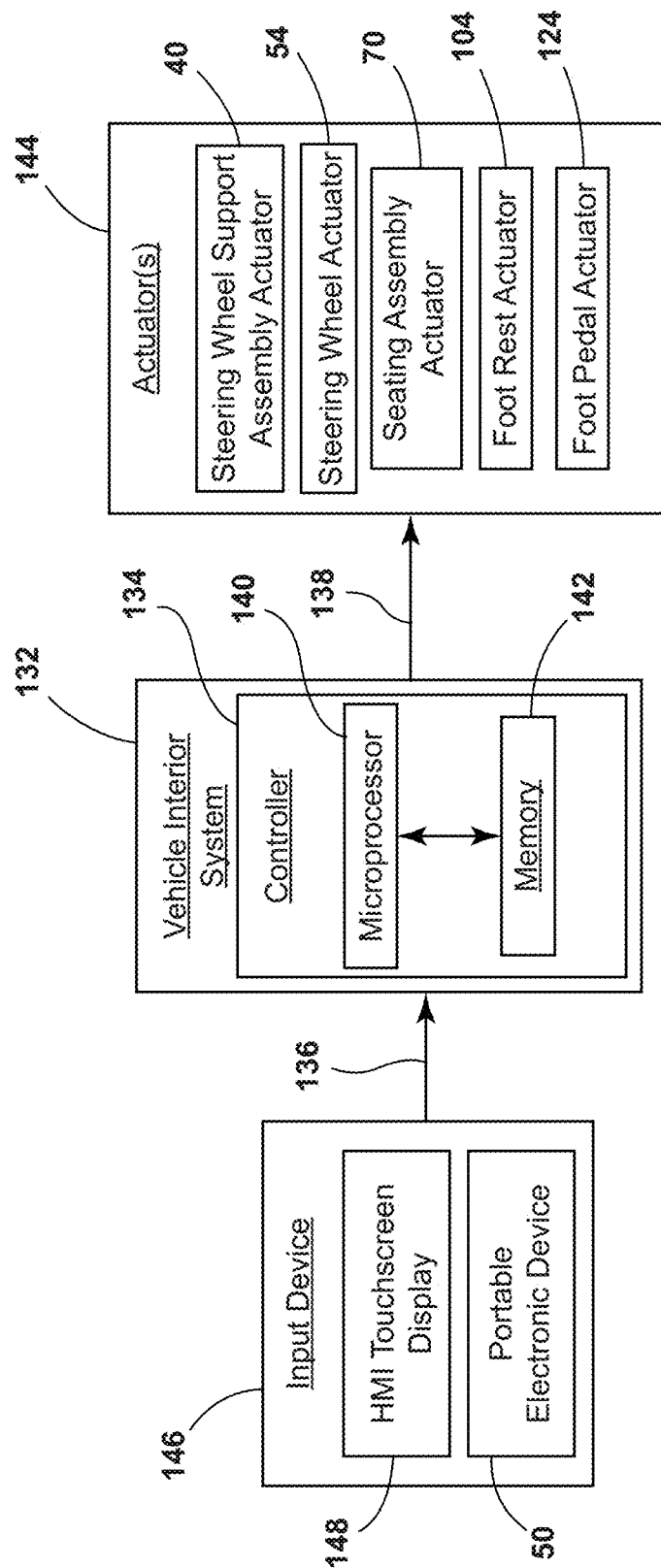
FIG. 15 is a block diagram of a vehicle interior system of the vehicle, according to one embodiment.

Referring now to FIG. 15, the vehicle 10 may include a steering wheel actuator 54. The steering wheel actuator 54 may be operable to actuate to move the steering wheel 36 between the steering wheel use and stowed positions. A variety of types of actuators 54 operable to pivot the steering wheel 36 between the steering wheel use and stowed positions are contemplated.

Referring now to FIGS. 2-5, as referenced above herein, the steering control system 34 can be operable between use and stowed configurations. A variety of use and stowed configurations are contemplated. In some implementations, the steering control system 34 may be in the use configuration when the steering wheel support assembly 32 is in the extended position, and the steering control system 34 may be in the stowed configuration when the steering wheel support assembly 32 is in the retracted position. In some embodiments, the steering control system 34 may be in the use configuration when the steering wheel 36 is in the steering wheel use position, and the steering control system 34 may be in the stowed configuration when the steering wheel 36 is in the steering wheel stowed position. In some embodiments, the steering control system 34 is in the use configuration when the steering wheel support assembly 32 is in the extended position and the steering wheel 36 is in the steering wheel use position, as illustrated in FIG. 2. Further, the steering control system 34 is in the stowed configuration when the steering wheel support assembly 32 is in the retracted position and the steering wheel 36 is in the steering wheel stowed position, as illustrated in FIG. 5. As such, in one embodiment, the use configuration of the steering control system 34 is illustrated in FIG. 2, and the stowed configuration of the steering control system 34 is illustrated in FIG. 5.

In some embodiments, in the steering wheel stowed position of the steering wheel 36 and the retracted position of the steering wheel support assembly 32, a portion of the steering wheel 36 is positioned beneath a portion of the dashboard 18. In other words, in a condition where the steering wheel 36 is in the steering wheel stowed position and the steering wheel support assembly 32 is in the retracted position, a portion of the steering wheel 36 is positioned beneath a portion of the dashboard 18. In some examples, in the steering wheel stowed position of the steering wheel 36 and the retracted position of the steering wheel support assembly 32, a portion of the steering wheel 36 is positioned within the housing 28 of the dashboard 18. For example, in various embodiments, in the steering wheel stowed position of the steering wheel 36 and the retracted position of the steering wheel support assembly 32, the portion of the steering wheel 36 that is received within the trough 42 defined by the trim component 38 of the steering wheel support assembly 32 is positioned beneath a portion of the dashboard 18 and/or within the housing 28, as illustrated in FIG. 5. In the illustrated embodiment, the majority of the steering wheel 36 is positioned within the housing 28 in the steering wheel stowed position of the steering wheel 36 and the retracted position of the steering wheel support assembly 32.

Referring now to FIGS. 2-5, 7, and 8, the vehicle 10 may include a seating assembly 56. In various embodiments, the vehicle 10 may include a plurality of seating assemblies 56. For example, as illustrated in FIGS. 2-5 and 7, the vehicle interior 14 may include a driver seating assembly 58, a front passenger seating assembly 60, and one or more rows 62 of rear seating assemblies. The seating assembly 56 may be positioned within the vehicle interior 14 and may include a seat base 64. The seat base 64 may be coupled to the floor 16 of the vehicle 10, as described further herein. The seat base 64 includes an upper seat base surface 66. The upper seat base surface 66 faces generally vehicle-upward and is positioned within the vehicle interior 14 to support a user U seated in the seating assembly 56. As illustrated in FIGS. 2-5, the upper seat base surface 66 may be positioned vehicle-downward of the underside 20 of the dashboard 18 of the vehicle 10.

Figure 7:
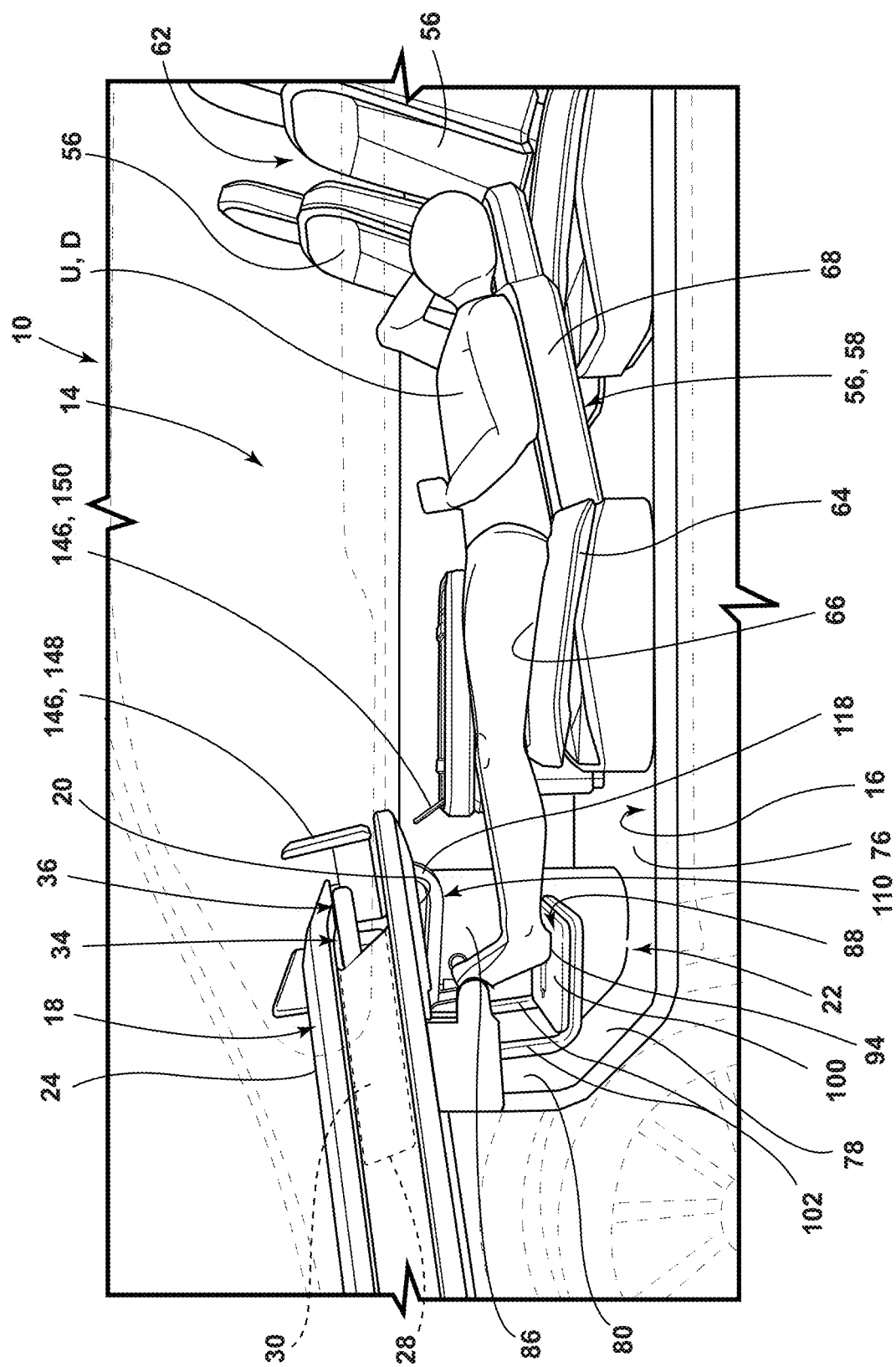
FIG. 7 is a side perspective view of the vehicle interior, illustrating a user lying in a supine position in a seating assembly with a reclined seatback with the user's feet resting on the foot rest, according to one embodiment.

Referring still to FIGS. 2-5, 7, and 8, the seating assembly 56 may include a seatback 68. The seatback 68 may be coupled to the seat base 64. In various embodiments, the seatback 68 may be pivotably coupled to the seat base 64 and operable to pivot relative to the seat base 64 between an upright position and a reclined position. For example, the seatback 68 of the driver seating assembly 58 illustrated in FIGS. 5 and 7 is pivotably coupled to the seat base 64 and operable to pivot relative to the seat base 64 between the upright position, as illustrated in FIG. 5, and the reclined position, as illustrated in FIG. 7. It is contemplated that the seating assembly 56 may be adjusted in a variety of ways, in various implementations. For example, in some embodiments, adjustment may be made to the angle of the seat base 64, the position of a lumbar support, the height of the seat base 64, the position of thigh bolsters, and/or a variety of other seating assembly features.

Figure 12:
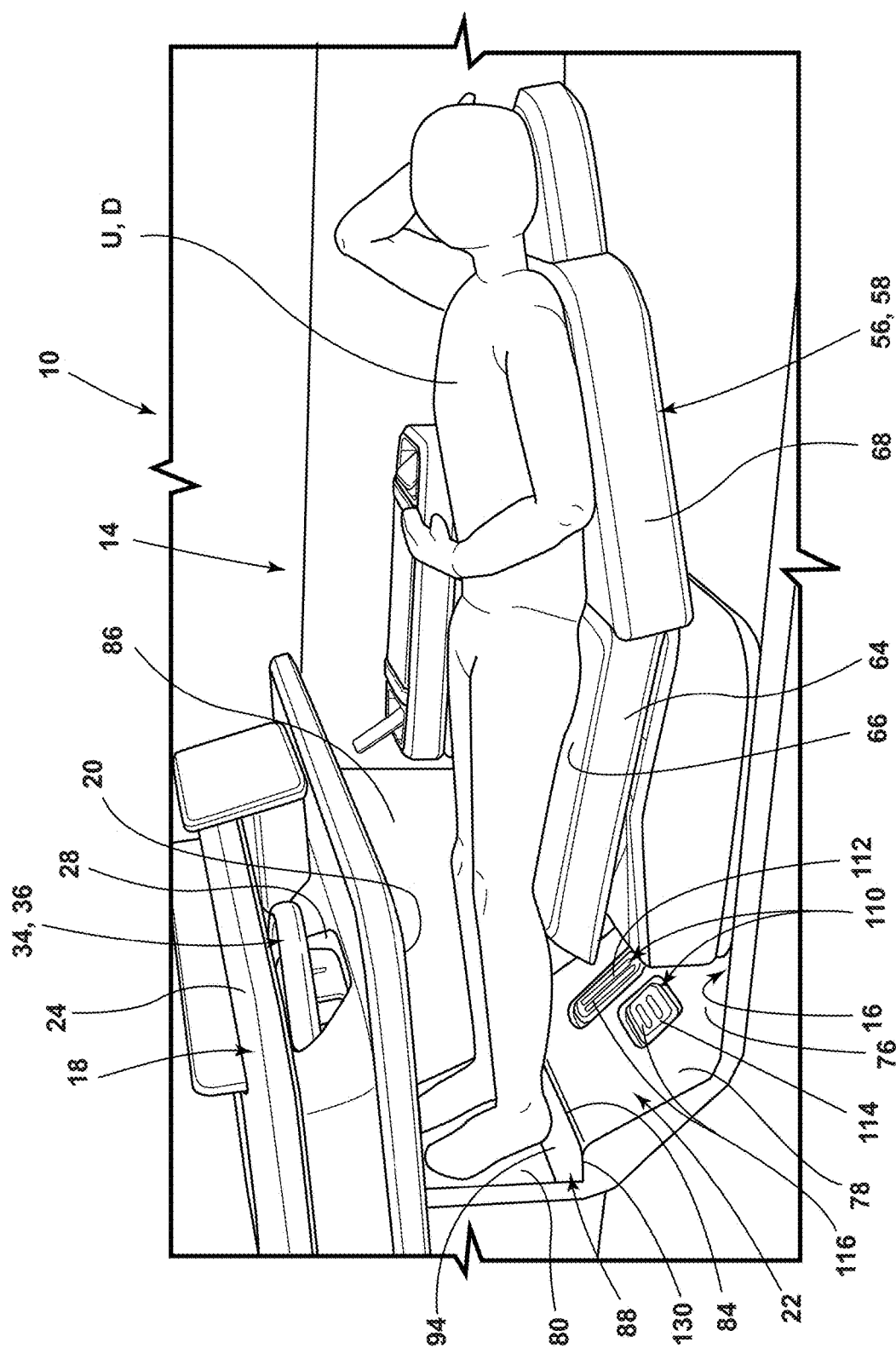
FIG. 12 is an upper perspective view of the vehicle interior, illustrating a foot rest within the foot well of the vehicle, and the user utilizing the foot rest in a supine position, according to one embodiment.

In various embodiments, the seating assembly 56 may be movable within the vehicle interior 14. The seating assembly 56 may be movably coupled to the floor 16 of the vehicle 10, in some embodiments. For example, the seating assembly 56 may be coupled to the floor 16 by a guide track (not shown) and operable to slide along the guide track within the vehicle interior 14. In some implementations, the seating assembly 56 may be operable to move between a vehicle-rearward position and a vehicle-forward position. For example, as illustrated in FIG. 5, the driver seating assembly 58 is positioned in a vehicle-rearward position, such that the vehicle-forward-most portion of the seat base 64 is vehicle-rearward of the vehicle-rearward-most portion of the dashboard 18. Conversely, the driver seating assembly 58 illustrated in FIG. 12 is positioned in the vehicle-forward-most position, such that a portion of the seat base 64 is positioned beneath (i.e., directly vehicle-downward of) a portion of the dashboard 18. It is contemplated that the seating assembly 56 may move within the vehicle interior 14 in a variety of vehicle directions, in some embodiments.

Referring now to FIG. 15, the vehicle 10 may include one or more seating assembly actuators 70. The one or more seating assembly actuators 70 may be configured to adjust one or more portions of the seating assembly 56 and/or move the seating assembly 56 within the vehicle interior 14. In an exemplary embodiment, the seating assembly 56 may include a first seating assembly actuator 70 that actuates to pivot the seatback 68 between the upright and reclined positions, and a second seating assembly actuator 70 that actuates to move the seat base 64 along the guide track between the aforementioned vehicle-forward and vehicle-rearward positions. Various embodiments of the vehicle 10 having more or fewer seating assembly actuators 70 are contemplated.

Referring now to FIGS. 7 and 12-14B, the vehicle 10 may include a foot well 22 that corresponds with the seating assembly 56. In various embodiments, the vehicle 10 includes a plurality of foot wells 22 that correspond with the plurality of seating assemblies 56. For example, in the embodiment illustrated in FIG. 8, the vehicle interior 14 includes a first foot well 72 that corresponds with the driver seating assembly 58, and a second foot well 74 that corresponds with the front passenger seating assembly 60. A variety of components of the vehicle 10 may define the foot well 22. In some embodiments, the vehicle-forward-most portion of the seat base 64 of the seating assembly 56 that corresponds with the foot well 22 may delineate the vehicle-rearward-most portion of the foot well 22. In other words, the foot well 22 may be positioned vehicle-forward of the corresponding seating assembly 56. In various embodiments, the foot well 22 may be at least partially defined by the floor 16 of the vehicle 10. The floor 16 may include a base portion 76. In various embodiments, the base portion 76 may be generally level. For example, in some embodiments, the surface of the base portion 76 of the floor 16 may be generally parallel to the surface of the ground that the vehicle 10 is positioned upon. In various embodiments, the seating assembly 56 may be coupled to the base portion 76 of the floor 16. For example, the seating assembly 56 may be coupled to the base portion 76 of the floor 16 via the guide track which is coupled directly to the base portion 76, in some implementations. In some implementations, the base portion 76 may define at least a portion of the foot well 22.

In some embodiments, the floor 16 may include an inclined portion 78 that extends vehicle-upward and vehicle-forward from the base portion 76. The inclined portion 78 may at least partially define the foot well 22. For example, as illustrated in FIGS. 7, 12, and 13, the floor 16 includes the inclined portion 78 which extends vehicle-upward and vehicle-forward from the base portion 76 of the floor 16 and partially defines the foot well 22 corresponding with the driver seating assembly 58.

In various embodiments, the floor 16 may include a front wall portion 80. The front wall portion 80 may extend in a vehicle-upward direction to or proximate to the underside 20 of the dashboard 18 of the vehicle 10. In some embodiments, the front wall portion 80 extends to a terminal edge 82 of the floor 16. For example, as illustrated in FIGS. 14A and 14B, the front wall portion 80 extends vehicle-upward from the inclined portion 78 of the floor 16 to a terminal edge 82 of the floor 16 proximate to the underside 20 of the dashboard 18. As illustrated in FIG. 7, in some embodiments, the front wall portion 80 of the floor 16 may extend vehicle-upward in a direction that is generally perpendicular to the surface of the base portion 76 of the floor 16. It is contemplated that, in some embodiments, the inclined portion 78 may be the front wall portion 80 of the floor 16 and extend vehicle-upward and vehicle-forward from the base portion 76 of the floor 16 to or proximate to the underside 20 of the dashboard 18. In various embodiments, the front wall portion 80 of the floor 16 may at least partially define the vehicle-forward end of the foot well 22.

Figure 13:
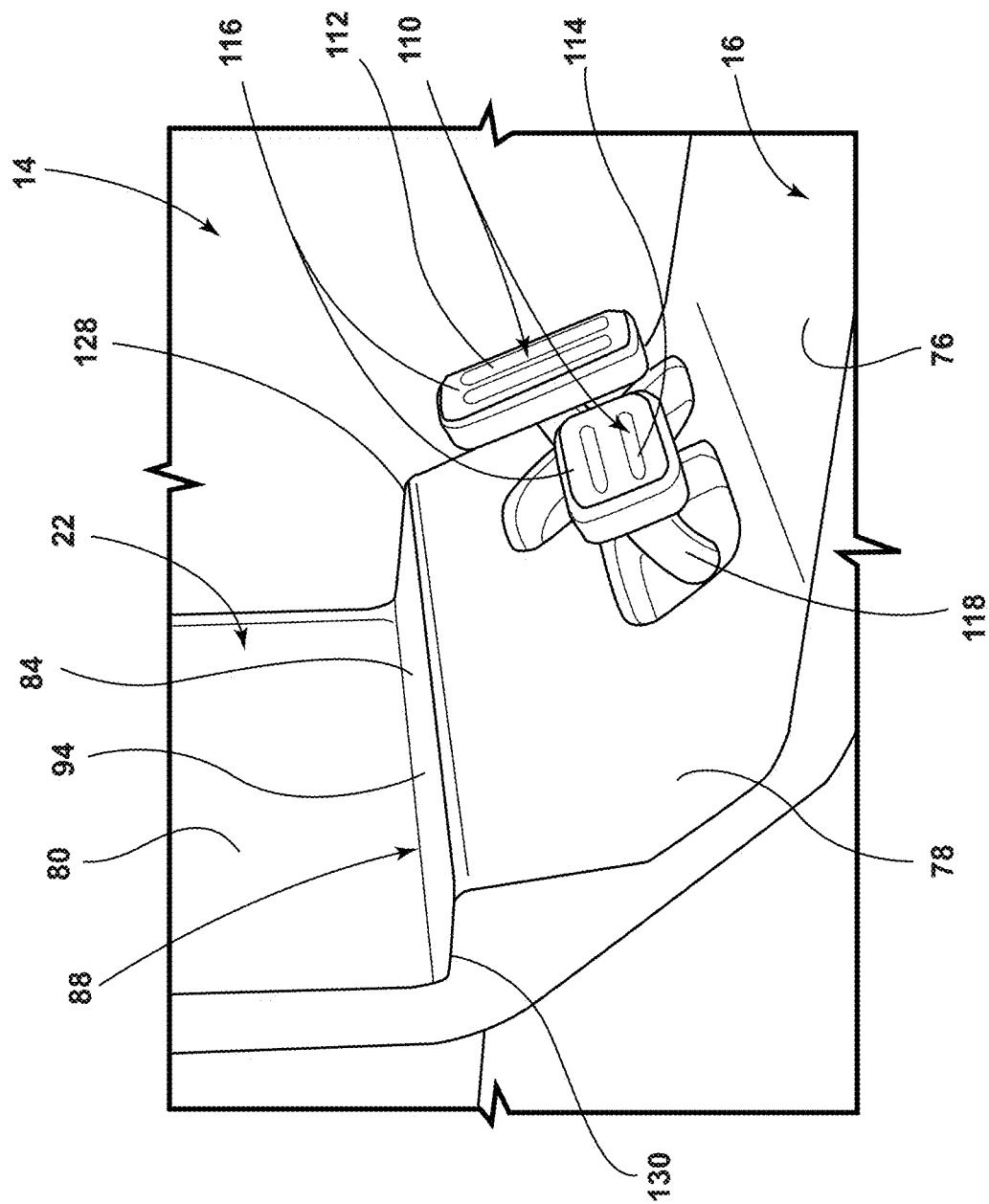
FIG. 13 is a side perspective view of the foot well of the vehicle, illustrating the foot pedal and a floor of the vehicle extending from a base portion to a shelf portion that comprises the foot rest, according to one embodiment.

Referring now to FIGS. 12 and 13, in some embodiments, the floor 16 may include a shelf portion 84. In various implementations, the shelf portion 84 may be positioned vehicle-upward of the inclined portion 78 and may extend vehicle-forward from the inclined portion 78 of the floor 16. As illustrated in FIG. 12, the shelf portion 84 may extend between the inclined portion 78 of the floor 16 and the front wall portion 80 of the floor 16. The surface of the shelf portion 84 of the floor 16 may be substantially parallel to the surface of the base portion 76 of the floor 16. In some examples, the surface of the shelf portion 84 of the floor 16 may be substantially perpendicular to the surface of the front wall portion 80 of the floor 16. In various embodiments, the shelf portion 84 may at least partially define the foot well 22 of the corresponding seating assembly 56.

In the embodiment illustrated in FIG. 12, the driver seating assembly 58 is coupled to the base portion 76 of the floor 16 of the vehicle 10. The inclined portion 78 of the floor 16 extends vehicle-upward and vehicle-forward from the base portion 76. The shelf portion 84 of the floor 16 extends vehicle-forward from the inclined portion 78 of the floor 16, such that the surface of the shelf portion 84 and the surface of the base portion 76 are substantially parallel to each other. The front wall portion 80 of the floor 16 extends vehicle-upward from the shelf portion 84 in a direction generally perpendicular to the surface of the shelf portion 84. The front wall portion 80, the shelf portion 84, the inclined portion 78, and the base portion 76 of the floor 16 vehicle-forward of the driver seating assembly 58 cooperate to at least partially define the foot well 22 that corresponds with the driver seating assembly 58.

Referring now to FIG. 7, the underside 20 of the dashboard 18 of the vehicle 10 may extend over the foot well 22. In various embodiments, the dashboard 18 may at least partially define the foot well 22. The dashboard 18 may extend over the base portion 76, the inclined portion 78, the shelf portion 84, and/or the front wall portion 80 of the floor 16, in various embodiments. For example, as illustrated in FIG. 12, the dashboard 18 extends over the base portion 76, inclined portion 78, shelf portion 84, and front wall portion 80 of the floor 16.

In some embodiments, the sides of the foot well 22 may be defined by one or more sides of the vehicle 10 and/or a lateral partition 86 coupled to the dashboard 18, such as a center console. The lateral partition 86 coupled to the dashboard 18 may separate the first foot well 72 that corresponds with the driver seating assembly 58 of the vehicle 10 from the second foot well 74 that corresponds with the front passenger seating assembly 60 of the vehicle 10, as illustrated in FIG. 8.

Referring now to FIGS. 2-14B, in various embodiments, the vehicle 10 may include a foot rest 88 that is positioned within the foot well 22 of the vehicle 10 and/or at least partially defining the foot well 22 of the vehicle 10. In some embodiments, the vehicle 10 may include a plurality of foot rests 88 that are positioned within and/or at least partially define a plurality of corresponding foot wells 22 of the vehicle 10. For example, as illustrated in FIG. 8, a first foot rest 90 is positioned within the first foot well 72 that corresponds with the driver seating assembly 58, and a second foot rest 92 is positioned within the second foot well 74 that corresponds with the front passenger seating assembly 60.

Referring still to FIGS. 2-14B, in various embodiments, the foot rest 88 may include an upper support surface 94. The upper support surface 94 may be configured to support the foot of a user U utilizing the foot rest 88. In various embodiments, the upper support surface 94 of the foot rest 88 may face vehicle-upward in a foot rest use position of the foot rest 88. As described further herein, in some embodiments, the foot rest 88 may be generally fixed in the foot rest use position (i.e., generally stationary within the foot well 22), and, in some embodiments, the foot rest 88 may be operable to move between the foot rest use position and a foot rest stowed position. The upper support surface 94 of the foot rest 88 may be parallel with the surface of the base portion 76 of the floor 16 in the foot rest use position, in some embodiments.

Referring now to FIGS. 5, 7, and 12, in some embodiments, in the foot rest use position, the height of the upper support surface 94 of the foot rest 88 may correspond with the height of the upper seat base surface 66 of the corresponding seating assembly 56. For example, in some embodiments, the height of the upper support surface 94 of the foot rest 88 may be equal to the height of the upper seat base surface 66 of the seating assembly 56. In some embodiments, the heights of the upper support surface 94 and the upper seat base surface 66 may correspond, such that the height of the upper support surface 94 is offset from the height of the upper seat base surface 66 less than or equal to a predetermined vehicle-vertical distance. In some implementations, the predetermined vehicle-vertical distance may be a distance between about 0 inches and about 6 inches. In some embodiments, the predetermined vehicle-vertical distance may be a distance between about 0 inches and about 3 inches. In some embodiments, the predetermined vehicle-vertical distance may be a distance between about 0 inches and about 1.5 inches. In various embodiments, the height of the upper support surface 94 of the foot rest 88 may be offset from the height of the upper seat base surface 66 in a vehicle-downward direction. In other words, the height of the upper seat base surface 66 may be greater than the height of the upper support surface 94. It is contemplated that the upper support surface 94 may have a greater height than the upper seat base surface 66, in some embodiments. As used herein, the height of the upper seat base surface 66 may be equal to the height of the vehicle-upward-most portion of the upper seat base surface 66.

Referring now to FIGS. 12 and 13, in some embodiments, the foot rest 88 may comprise the shelf portion 84 of the floor 16 of the vehicle 10. As illustrated in FIGS. 12 and 13, the shelf portion 84 of the floor 16 is the foot rest 88 and the surface of the shelf portion 84 is the upper support surface 94 of the foot rest 88. As such, because the shelf portion 84 is vehicle-upward of the inclined portion 78 of the floor 16, the foot rest 88, likewise, is vehicle-upward of the inclined portion 78 of the floor 16. In the embodiment illustrated in FIGS. 12 and 13, wherein the foot rest 88 comprises the shelf portion 84 of the floor 16, the foot rest 88 is fixed in the foot rest use position, as the foot rest 88 is generally stationary within the vehicle interior 14. In the illustrated embodiment, the foot rest 88 at least partially defines the foot well 22 of the vehicle 10.

Figure 6:
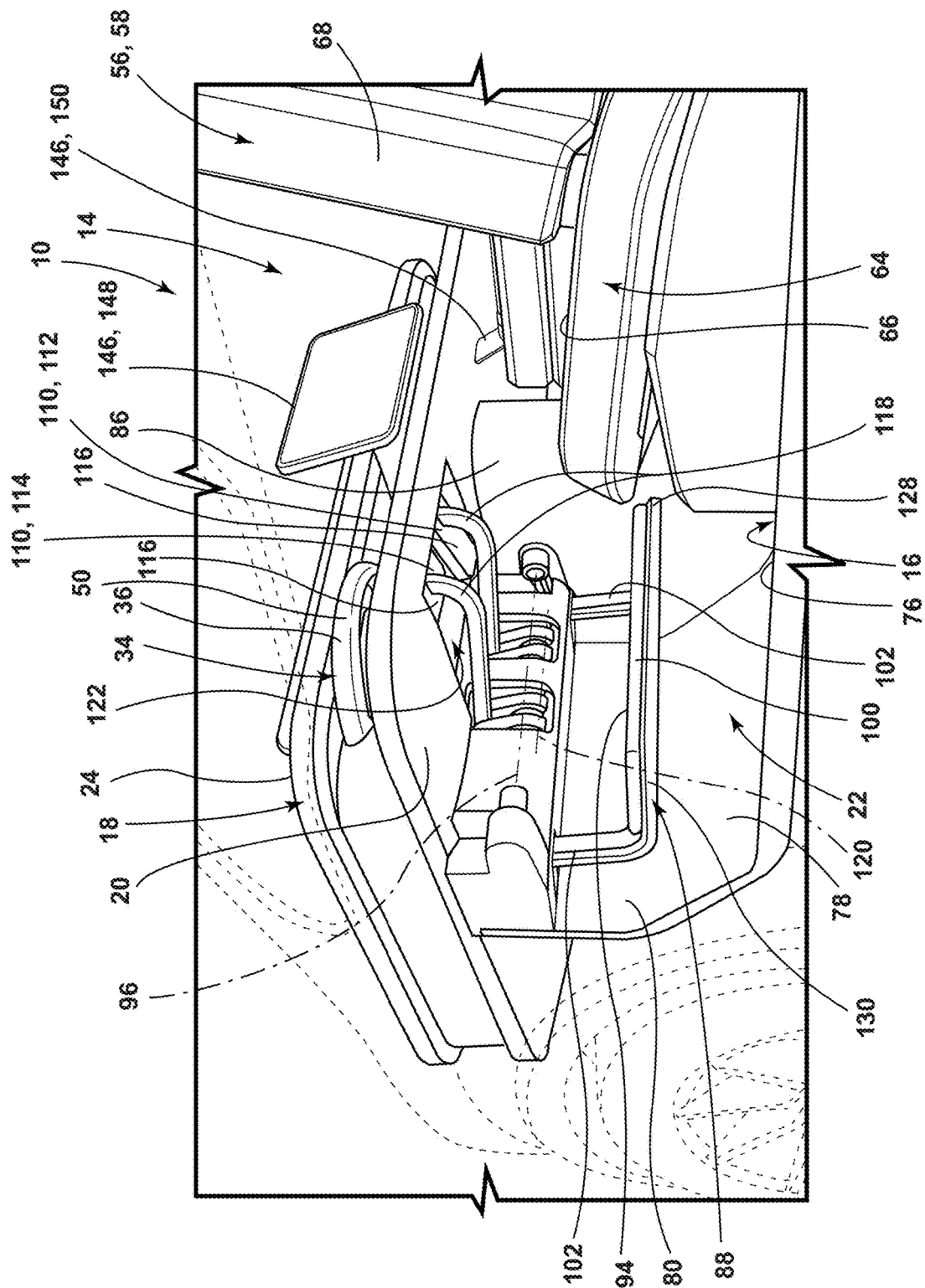
FIG. 6 is a lower perspective view of a foot well of the vehicle interior, illustrating the foot pedal received within a foot pedal recess defined by an underside of a dashboard of the vehicle in the foot pedal stowed position, according to one embodiment.

Referring now to FIGS. 2-5, 9-11, 14A, and 14B, in some embodiments, the foot rest 88 may be movable between the foot rest use position and the foot rest stowed position. In some implementations, the foot rest 88 may be operable to pivot within the foot well 22 of the vehicle 10 between the foot rest use position and the foot rest stowed position about a foot rest pivot axis 96, as illustrated in FIGS. 6, 9-11, 14A, and 14B. The foot rest pivot axis 96 may extend substantially vehicle-laterally, in some embodiments, as illustrated in FIG. 6. It is contemplated that the foot rest pivot axis 96 may extend in various vehicle directions.

In various embodiments, the foot rest 88 may be positioned within the foot well 22 in the foot rest use and stowed positions. In some implementations, the foot rest 88 may be proximate to and/or in contact with the front wall portion 80 of the floor 16 in the foot rest stowed position. For example, as illustrated in FIGS. 2, 3, and 14A, the foot rest 88 is positioned in the foot rest stowed position and proximate to and/or in contact with the front wall portion 80 of the floor 16 vehicle-downward of the dashboard 18.

Referring now to FIGS. 14A and 14B, in some embodiments, the upper support surface 94 of the foot rest 88 may face vehicle-forward in the foot rest stowed position and vehicle-upward in the foot rest use position. For example, in the embodiment illustrated in FIGS. 14A and 14B, the upper support surface 94 of the foot rest 88 faces vehicle-forward in the foot rest stowed position, as illustrated in FIG. 14A, and faces vehicle-upward in the foot rest use position, as illustrated in FIG. 14B. In some embodiments, a portion of the floor 16 of the vehicle 10 that is vehicle-upward and vehicle-forward of the base portion 76 of the floor 16 may define a foot rest recess 98. The foot rest recess 98 may at least partially receive the foot rest 88 therein in the foot rest stowed position. For example, as illustrated in FIG. 14B, the front wall portion 80 of the floor 16 of the vehicle 10 defines the foot rest recess 98. As illustrated in FIG. 14A, the foot rest 88 is received within the foot rest recess 98 defined by the front wall portion 80 of the floor 16 in the foot rest stowed position.

Referring now to FIGS. 2-5, in some embodiments, the upper support surface 94 of the foot rest 88 may face vehicle-rearward in the foot rest stowed position and vehicle-upward in the foot rest use position. For example, in the embodiment illustrated in FIGS. 2 and 3, the foot rest 88 is in the foot rest stowed position and the upper support surface 94 of the foot rest 88 faces vehicle-rearward. Further, as illustrated in FIG. 5, the foot rest 88 is in the foot rest use position and the upper support surface 94 faces vehicle-upward. In the embodiment illustrated in FIGS. 2-5, the foot rest 88 includes a platform portion 100 that includes the upper support surface 94 of the foot rest 88, and two arms 102 that extend from the platform portion 100 of the foot rest 88 toward the foot rest pivot axis 96 about which the foot rest 88 pivots between the foot rest use and stowed positions. Various embodiments of the foot rest 88 are contemplated.

Referring now to FIG. 15, the vehicle 10 may include a foot rest actuator 104 that is operable to actuate to propel the foot rest 88 between the foot rest use and stowed positions. A variety of types of actuators 104 are contemplated. In some embodiments, the foot rest 88 may be propelled between the foot rest use and stowed positions as a result of the movement of other components of the vehicle 10. In some embodiments, movement of the steering wheel support assembly 32 between the retracted and extended positions may cause the foot rest 88 to move between the foot rest use and stowed positions. For example, in the embodiment illustrated in FIGS. 9-11, a linear gear 106 is coupled to the steering wheel support assembly 32 and is operable to engage a gear system 108 coupled to the foot rest 88, such that, as the steering wheel support assembly 32 moves from the extended position, as illustrated in FIG. 9, to the retracted position, as illustrated in FIG. 11, engagement of the linear gear 106 with the gear system 108 causes the foot rest 88 to move from the foot rest stowed position, as illustrated in FIG. 9, to the foot rest use position, as illustrated in FIG. 11. It is contemplated that the foot rest 88 may be moved manually between the foot rest use and stowed positions, in some implementations.

Referring now to FIGS. 2-14B, a foot pedal 110 may be positioned within the foot well 22 of the vehicle 10. In various embodiments, a plurality of foot pedals 110 may be positioned within the foot well 22. For example, the foot well 22 may include an accelerator pedal 112, and a brake pedal 114, as illustrated in FIGS. 2-8 and 12-14B. It is contemplated that a variety of other types of foot pedals 110 may be positioned within the foot well 22, additionally or alternatively, in some embodiments (e.g., clutch pedal, parking brake pedal, etc.). In various embodiments, the foot pedal 110 may be configured to be depressed by the foot of the user U of the vehicle 10 to perform a vehicle function, such as an acceleration input or a braking input, as is customary in vehicles. In some embodiments, the foot pedal 110 may be a suspended pedal, as shown in FIGS. 2-8. In some embodiments, the foot pedal 110 may be a floor mounted foot pedal, as illustrated in FIGS. 12-14B. A variety of types of floor mounted foot pedals 110 are contemplated (e.g., organ type foot pedal, bottom hinged foot pedal, etc.). In the embodiment illustrated in FIGS. 12 and 13, the foot pedals 110 are configured to move linearly as depressed by the user U. It is contemplated that the foot well 22 may include multiple foot pedals 110 having similar or different pedal styles relative to each other.

In various embodiments, the foot pedal 110 may include a pad 116 that is configured to be engaged by the foot of the vehicle user U depressing the foot pedal 110. In various embodiments, the accelerator pedal 112 and/or the brake pedal 114 may include the pad 116. As illustrated in FIGS. 2-7, the foot pedal 110 may include a lever 118. The lever 118 may be coupled to the pad 116 and may be configured to move in response to the foot pedal 110 being depressed. In various embodiments, the lever 118 may be configured to pivot as the foot pedal 110 is depressed by the vehicle user U. The lever 118 may extend vehicle-upward from the pad 116 of the foot pedal 110 in the foot pedal use position, as illustrated in FIGS. 2 and 3. It is contemplated that the lever 118 may extend in a variety of vehicle directions in the foot pedal use position of the foot pedal 110, in various embodiments. For example, and as illustrated in FIGS. 14A and 14B, the lever 118 extends generally vehicle-downward from the pad 116 in the foot pedal use position. In various embodiments, the lever 118 may be coupled to a surface of the pad 116 that is opposite of the surface of the pad 116 that is configured to be engaged by the foot of the vehicle user U.

As described further herein, in some embodiments, the foot pedal 110 may be operable between the foot pedal use position and a foot pedal stowed position. It is contemplated that the foot pedal 110 may be configured to remain in the foot pedal use position (i.e., not have a foot pedal stowed position), in some embodiments. It is further contemplated that the foot pedal 110 may be operable to move within the foot well 22 while in the foot pedal use position as the foot pedal 110 is depressed by the vehicle user U.

Referring now to FIGS. 1-8, 12, and 13, the foot pedal 110 within the foot well 22 may be operable between the foot pedal use position and the foot pedal stowed position. In some embodiments, the foot pedal 110 may be operable to pivot between the foot pedal use and stowed positions about a foot pedal pivot axis 120. The foot pedal pivot axis 120 may extend substantially vehicle-laterally. In some embodiments, the foot pedal pivot axis 120 and the foot rest pivot axis 96 may be substantially parallel to each other. In some embodiments, the foot rest pivot axis 96 may be positioned vehicle-rearward of the foot pedal pivot axis 120. For example, in the embodiment illustrated in FIGS. 9-11, the foot rest pivot axis 96 is positioned vehicle-rearward of the foot pedal pivot axis 120. The foot pedal 110 may move between the foot pedal stowed and use positions in a variety of ways. For example, in the embodiment illustrated in FIGS. 12 and 13, the foot pedal 110 may move linearly from the foot pedal use position, as illustrated in FIG. 13, to the foot pedal stowed position, as illustrated in FIG. 12, wherein the foot pedal 110 is nested within the floor 16 of the vehicle 10.

In some embodiments, the foot pedal 110 may pivot vehicle-upward such that the pad 116 of the foot pedal 110 is nearer to the dashboard 18 in the foot pedal stowed position than in the foot pedal use position. For example, as illustrated in FIGS. 2-5, the pad 116 of the foot pedal 110 in the foot pedal use position (FIGS. 2 and 3) is further from the dashboard 18 than the position of the foot pedal 110 in the foot pedal stowed position (FIGS. 5 and 6).

Referring now to FIG. 6, in some embodiments, the underside 20 of the dashboard 18 may define a foot pedal receiving recess 122. The foot pedal 110 may be configured to be received within the foot pedal receiving recess 122 defined by the underside 20 of the dashboard 18 in the foot pedal stowed position, as illustrated in FIG. 6. In some embodiments, the pad 116 of the foot pedal 110 may be wholly outside of the foot pedal receiving recess 122 in the foot pedal use position, as illustrated in FIGS. 2 and 3, and the pad 116 of the foot pedal 110 may be wholly received within the foot pedal receiving recess 122 defined by the underside 20 of the dashboard 18 in the foot pedal stowed position, as illustrated in FIG. 6.

Referring now to FIGS. 2-14B, in some embodiments, the foot pedal 110 may be positioned vehicle-downward of the foot rest 88 in the foot pedal stowed position. For example, as illustrated in FIG. 12, wherein the foot rest 88 comprises the shelf portion 84 of the floor 16, the foot pedal 110 is nested within the inclined portion 78 of the floor 16 vehicle-downward of the foot rest 88 in the foot pedal stowed position. In some embodiments, the foot pedal 110 may be vehicle-upward of the foot rest 88 in the foot pedal stowed position, for example, as illustrated in FIG. 6, wherein the foot rest 88 is pivoted to the foot rest use position within the foot well 22, and the foot pedal 110 is positioned vehicle-upward of the foot rest 88 within the foot pedal receiving recess 122 defined by the underside 20 of the dashboard 18 in the foot pedal stowed position.

Referring now to FIG. 15, the vehicle 10 may include a foot pedal actuator 124 that is operable to actuate to propel the foot pedal 110 between the foot pedal use and stowed positions. A variety of types of actuators 124 are contemplated. In some embodiments, the foot pedal 110 may be propelled between the foot pedal use and stowed positions as a result of the movement of other components of the vehicle 10. In some embodiments, movement of the steering wheel support assembly 32 between the retracted and extended positions may cause the foot pedal 110 to move between the foot pedal stowed and use positions. For example, in the embodiment illustrated in FIGS. 9-11, the linear gear 106 is coupled to the steering wheel support assembly 32 and is operable to engage the gear system 108 coupled to the foot pedal 110, such that, as the steering wheel support assembly 32 moves from the extended position, as illustrated in FIG. 9, to the retracted position, as illustrated in FIG. 11, engagement of the linear gear 106 with the gear system 108 causes the foot pedal 110 to move from the foot pedal use position, as illustrated in FIG. 9, to the foot pedal stowed position, as illustrated in FIG. 11. In various embodiments, the gear system 108 may include one or more gears 126 that are configured to be engaged with the linear gear 106 and/or each other in operation. In the embodiment illustrated in FIGS. 9-11, the gear system 108 includes a plurality of gears 126, such that engagement of at least one of the plurality of gears 126 by the linear gear 106 as the steering wheel support assembly 32 moves from the extended position to the retracted position causes both the foot pedal 110 to pivot to the foot pedal stowed position and the foot rest to pivot to the foot rest use position. It is contemplated that the foot pedal 110 may be moved manually between the foot pedal use and stowed positions, in some implementations.

Figure 14:
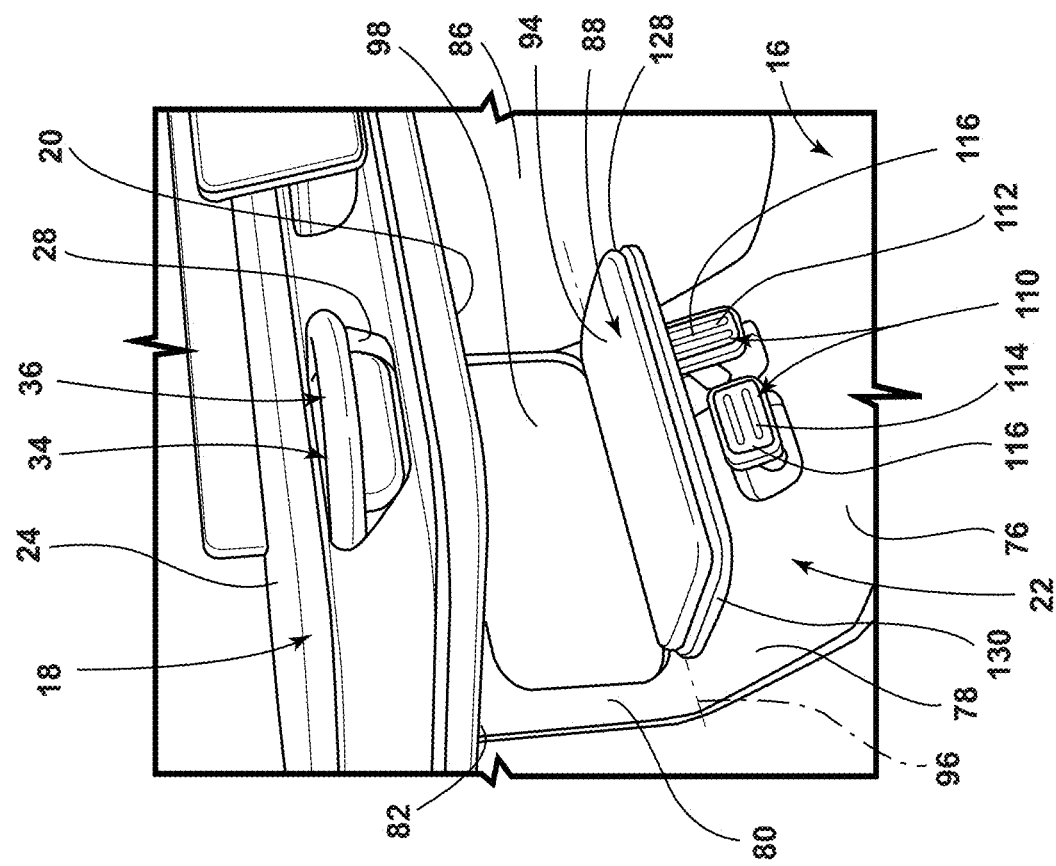
FIG. 14A is an upper perspective view of the foot well of the vehicle, illustrating the foot rest in the foot rest stowed position, according to one embodiment.
FIG. 14B is an upper perspective view of the foot well of the vehicle interior, illustrating the foot rest in the foot rest use position, according to one embodiment.

Referring now to FIGS. 12-14B, in various embodiments, the foot rest 88 may include a laterally-inboard end 128 and a laterally-outboard end 130. The foot rest 88 may extend between the laterally-inboard and laterally-outboard ends 128, 130. The laterally-inboard end 128 may be nearer to a longitudinal centerline (i.e., a longitudinally extending line at a lateral midpoint of the vehicle 10) of the vehicle 10 than the laterally-outboard end 130. In some implementations, wherein the vehicle foot well 22 includes the accelerator pedal 112 and the brake pedal 114, the brake and accelerator pedals 114, 112 may be vehicle-laterally-inboard of the laterally-outboard end 130 of the foot rest 88 and vehicle-laterally-outboard of the laterally-inboard end 128 of the foot rest 88. For example, in the embodiment illustrated in FIGS. 12 and 13, the foot rest 88 comprises the shelf portion 84 and extends from the laterally-outboard end 130 to the laterally-inboard end 128, and the accelerator and brake pedals 112, 114 are positioned vehicle-laterally-inboard of the laterally-outboard end 130 and vehicle-laterally-outboard of the laterally-inboard end 128. In other words, the vehicle-lateral position of both the brake pedal 114 and the accelerator pedal 112 is between the vehicle-lateral position of the laterally-outboard end 130 of the foot rest 88 and the laterally-inboard end 128 of the foot rest 88. As illustrated in FIG. 14B, in some embodiments, the foot pedal 110 of the vehicle 10 may be beneath (i.e., directly vehicle-downward of) the foot rest 88 in the foot rest use position.

Referring now to FIG. 15, a vehicle interior system 132 of the vehicle 10 is illustrated. The vehicle interior system 132 may include a controller 134 which may be configured to receive various inputs 136 and generate various output signals 138 to control outputs that may involve a variety of vehicle components and/or systems, as described further herein. The controller 134 may be a shared or dedicated controller that includes a microprocessor 140 and memory 142, as illustrated in FIG. 15, according to various embodiments. It should be appreciated that the controller 134 may include control circuitry, such as analog and/or digital control circuitry. Stored within the memory 142 and executed by the microprocessor 140 is logic for processing the various inputs 136 and controlling various outputs, as described further herein.

As illustrated in FIG. 15, the controller 134 may be in communication with one or more actuators 144 of the vehicle 10. For example, the controller 134 may be in communication with the steering wheel actuator 54, the steering wheel support assembly actuator 40, the seating assembly actuator 70, the foot rest actuator 104, and/or the foot pedal actuator 124, in various implementations. As described further herein, the controller 134 may be configured to generate one or more output signals 138 to control outputs related to the one or more actuators 144 in communication with the controller 134.

Referring still to FIG. 15, in various embodiments, the controller 134 of the vehicle interior system 132 may be in communication with an input device 146 that is configured to transmit inputs 136 to the controller 134. A variety of types of input devices 146 are contemplated. For example, the input device 146 may be coupled to the vehicle 10, such as a human machine interface (HMI) touchscreen display 148, as illustrated in FIG. 8. In some embodiments, a portable electronic device 150 may be the input device 146 in communication with the controller 134. For example, in some embodiments, a smart phone may be in communication with the controller 134 and configured to transmit inputs to the controller 134.

Referring still to FIG. 15, with respect to operation of the vehicle interior system 132 of the vehicle 10, the controller 134 of the vehicle interior system 132 is configured to receive one or more inputs 136 from the input device 146 and generate one or more output signals 138 that are relayed to the one or more actuators 144 in communication with the controller 134. The one or more actuators 144 are configured to actuate based on the output signals 138 from the controller 134.

It is contemplated that, in some implementations, the plurality of actuators 144 within the vehicle interior 14 may be controlled by the controller 134 based on the selection of a plurality of input options made available via one or more input devices 146. For example, a first input device 146 coupled to the seating assembly 56 may be used to actuate the seating assembly actuator 70 and another input device 146 coupled to the steering wheel 36 may be used to actuate the steering wheel actuator 54. In some embodiments, selection of an input option by the user U may cause the controller 134 to prompt actuation of a plurality of actuators 144. For example, the input device 146 may provide a first input option ("sleep mode") and a second input option ("use mode").

In an exemplary embodiment, in response to the selection of the sleep mode on the input device 146, the controller 134 may prompt actuation of the steering wheel actuator 54 to move the steering wheel 36 from the steering wheel use position to the steering wheel stowed position, actuation of the steering wheel support assembly actuator 40 to move the steering wheel support assembly 32 from the extended position to the retracted position, actuation of the foot pedal actuator 124 to move the foot pedal 110 from the foot pedal use position to the foot pedal stowed position, actuation of the foot rest actuator 104 to move the foot rest 88 from the foot rest stowed position to the foot rest use position, and/or actuation of the seating assembly actuator 70 to move the seatback 68 from the upright position to the reclined position. In various examples, in response to the selection of the sleep mode, the controller 134 may additionally prompt the one or more seating assembly actuators 70 to move the seating assembly 56 within the vehicle interior 14 (e.g., from the vehicle-rearward position to the vehicle-forward position) and/or adjust the position of various seating assembly components relative to one another (e.g., lumbar support, seat base 64, head rest, etc.).

In some embodiments, in response to the selection of the use mode, the controller 134 may prompt actuation of the steering wheel actuator 54 to move the steering wheel 36 from the steering wheel stowed position to the steering wheel use position, actuation of the steering wheel support assembly actuator 40 from the retracted position to the extended position, actuation of the foot pedal actuator 124 to move the foot pedal 110 from the foot pedal stowed position to the foot pedal use position, actuation of the foot rest actuator 104 to move the foot rest 88 from the foot rest use position to the foot rest stowed position, and/or actuation of the seating assembly actuator 70 to move the seatback 68 from the reclined position to the upright position. In various examples, in response to the selection of the use mode, the controller 134 may additionally prompt the one or more seating assembly actuators 70 to move the seating assembly 56 within the vehicle interior 14 (e.g., from the vehicle-forward position to the vehicle-rearward position) and/or adjust the position of various seating assembly components relative to one another (e.g., lumbar support, seat base 64, head rest, etc.).

In operation of an exemplary embodiment, the user U of the vehicle 10 may enter the vehicle 10 and sit in the driver seating assembly 58. Initially, the vehicle interior 14 may be arranged such that the steering wheel 36 is in the steering wheel use position, the steering wheel support assembly 32 is in the extended position, the seatback 68 is in the upright position, the foot rest 88 is in the foot rest stowed position, and the foot pedal 110 within the foot well 22 is in the foot pedal use position. Desiring to lie in a supine position, the user U selects the sleep mode option provided by the HMI touchscreen display 148 coupled to the dashboard 18 of the vehicle 10. The controller 134 receives the input 136 from the HMI 148 and, in response, prompts actuation of a plurality of actuators 144, such that, as illustrated sequentially in FIGS. 2-5, the steering wheel 36 pivots from the steering wheel use position to the steering wheel stowed position, the steering wheel support assembly 32 translates from the extended position to the retracted position, the foot rest 88 pivots from the foot rest stowed position to the foot rest use position, the foot pedal 110 pivots from the foot pedal use position to the foot pedal stowed position, and the seatback 68 of the seating assembly 56 in which the user U is seated pivots from the upright position to the reclined position. With the vehicle interior 14 configured as such, the user U is able to lie supine on the seating assembly 56 and rest the user's U feet on the upper support surface 94 of the foot rest 88.

Figure 16:
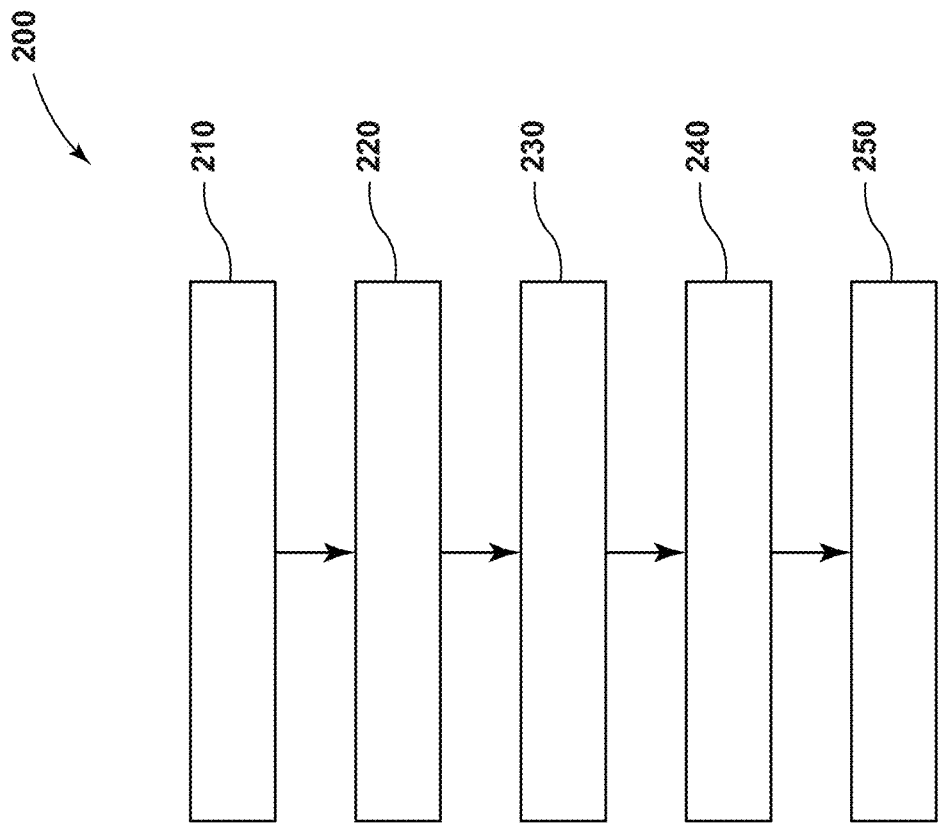
FIG. 16 is a flow diagram that illustrates a method of operating a vehicle, according to one embodiment.

Referring now to FIG. 16, a method 200 of operating a vehicle 10 is illustrated. The method 200 of operating the vehicle 10 may include the step 210 of receiving a user input 136. In various embodiments, the user input 136 may be received via the input device 146 and the input device 146 may be in communication with the controller 134. As described above herein, the controller 134 may prompt outputs based on the inputs 136 received from the input device 146.

The method 200 of operating the vehicle 10 may include the step 220 of adjusting the seating assembly 56. In some embodiments, the step 220 of adjusting the seating assembly 56 may entail adjusting the position of a portion of the seating assembly 56 relative to other portions of the seating assembly 56. For example, in some embodiments, the step 220 may entail pivoting the seatback 68 relative to the seat base 64 between the upright and reclined positions. In some implementations, the step 220 may entail pivoting the seatback 68 from the upright position to the reclined position and/or pivoting the seatback 68 from the reclined position to the upright position. In some implementations, the step 220 may entail adjusting the position of the seat base 64 relative to the seatback 68 (e.g., adjusting the angle of the seat base 64, adjusting the position of bolsters of the seat base 64, etc.). Various embodiments are contemplated. In some embodiments, the step 220 of adjusting the seating assembly 56 may entail moving the seating assembly 56 within the vehicle interior 14. For example, the step 220 may entail sliding the seat base 64 between the vehicle-forward position and the vehicle-rearward position. In various embodiments, the step 220 of adjusting the seating assembly 56 may be performed in response to performance of the step 210 of receiving the user input 136.

The method 200 of operating the vehicle 10 may include step 230 of moving the steering control system 34. In some embodiments, the step 230 may entail moving the steering control system 34 between the use and stowed configurations. For example, the step 230 may entail moving the steering control system 34 from the use configuration to the stowed configuration and/or from the stowed configuration to the use configuration. In some embodiments, the step 230 may entail moving the steering wheel support assembly 32 from the extended position to the retracted position and/or from the retracted position to the extended position. In some embodiments, the step 230 may entail moving the steering wheel 36 between the steering wheel use position and the steering wheel stowed position. In an exemplary embodiment, the step 230 may include pivoting the steering wheel 36 from the steering wheel use position to the steering wheel stowed position, wherein a portion of the steering wheel 36 is received within the trough 42 defined by the trim component 38 of the steering wheel support assembly 32, and translating the steering wheel support assembly 32 from the extended position to the retracted position. The step 230 of moving the steering control system 34 of the vehicle 10 may be performed in response to receiving the user input 136. Further, the step 230 may be performed simultaneously with the step 220, in some embodiments.

Referring still to FIG. 16, the method 200 of operating the vehicle 10 may include the step 240 of moving the foot pedal 110 between the foot pedal use position and the foot pedal stowed position. In some embodiments, the step 240 may entail moving the foot pedal 110 from the foot pedal use position to the foot pedal stowed position and/or moving the foot pedal 110 from the foot pedal stowed position to the foot pedal use position. In various embodiments, the foot pedal 110 may pivot between the foot pedal use and stowed positions. As illustrated in FIGS. 2-5, the foot pedal 110 pivots about the foot pedal pivot axis 120 from the foot pedal use position, as illustrated in FIG. 2, to the foot pedal stowed position, as illustrated in FIG. 5. In some embodiments, the step 240 may entail moving the foot pedal 110 such that the foot pedal 110 is received within the foot pedal receiving recess 122 defined by the underside 20 of the dashboard 18 of the vehicle 10 in the foot pedal stowed position, as illustrated in FIG. 6. As described above herein, it is contemplated that the foot pedal 110 may move between the foot pedal use and stowed positions in a variety of manners.

Step 240 of moving the foot pedal 110 between the foot pedal use position and the foot pedal stowed position may be performed in response to the step 210 of receiving the user input 136. Further, the step 240 may be performed simultaneously with the step 220 and/or the step 230, in some implementations. In some embodiments, performance of the step 240 of moving the foot pedal 110 between the foot pedal use position and the foot pedal stowed position may be caused by the performance of the step 230 of moving the steering control system 34. For example, moving the steering wheel support assembly 32 from the extended position to the retracted position in step 230 may cause the foot pedal 110 to move from the foot pedal use position to the foot pedal stowed position. As described above herein, in some implementations, engagement of the linear gear 106 coupled to the steering wheel support assembly 32 with the gear system 108 operably coupled to the foot pedal 110 may affect this causal relationship.

The method 200 of operating the vehicle 10 may include the step 250 of moving the foot rest 88 between the foot rest use position and the foot rest stowed position. The step 250 may entail moving the foot rest 88 from the foot rest stowed position to the foot rest use position and/or moving the foot rest 88 from the foot rest use position to the foot rest stowed position. As described above herein, the foot rest 88 may move between the foot rest use and stowed positions in a variety of manners. For example, the foot rest 88 may pivot between the foot rest use and stowed positions as illustrated sequentially in FIGS. 2-5.

The step 250 of moving the foot rest 88 between the foot rest use position and the foot rest stowed position may be performed in response to the step 210 of receiving user input 136. Further, the step 250 may be performed simultaneously with the step 220, the step 230, and/or the step 240, in some implementations. For example, the foot rest 88 may move from the foot rest stowed position to the foot rest use position as (1) the seatback 68 pivots from the upright position to the reclined position, (2) the foot pedal 110 moves from the foot pedal use position to the foot pedal stowed position, and/or (3) the steering wheel support assembly 32 moves from the extended position to the retracted position.

In some embodiments, performance of the step 250 of moving the foot rest 88 between the foot rest use position and the foot rest stowed position may be caused by the performance of the step 230 of moving the steering control system 34. For example, moving the steering wheel support assembly 32 from the extended position to the retracted position in step 230 may cause the foot rest 88 to move from the foot rest stowed position to the foot rest use position. As described above herein, in some implementations, engagement of linear gear 106 coupled to the steering wheel support assembly 32 with the gear system 108 operably coupled with foot rest 88 may effectuate this causal relationship.

In an exemplary embodiment of the method 200 of operating the vehicle 10, the step 230 entails translating the steering wheel support assembly 32 from the extended position to the retracted position, the step 240 entails pivoting the foot pedal 110 from the foot pedal use position to the foot pedal stowed position, and step 250 entails pivoting the foot rest 88 from the foot rest stowed position to the foot rest use position.

It is to be understood that variations and modifications can be made on the aforementioned structure without departing from the concepts of the present invention, and further it is to be understood that such concepts are intended to be covered by the following claims unless these claims by their language expressly state otherwise.

While all modern OEMs of passenger vehicles currently warn occupants against reclining the seat past a certain angle while the vehicle is moving and/or in riding in a fully reclined or supine position due to safety concerns, it is anticipated that technology and the regulatory framework may evolve in the future where such an activity is permissible.

What is claimed is:

1. A vehicle, comprising:
    a dashboard having an underside that extends over a foot well;
    a floor having a base portion and an inclined portion that at least partially defines the foot well and extends vehicle-upward and vehicle-forward from the base portion beneath the dashboard;
    a seating assembly that corresponds with the foot well, comprising:
        a seat base having an upper seat base surface positioned to support a seated occupant, wherein the upper seat base surface is positioned vehicle-downward of the underside of the dashboard; and
        a seatback operable to pivot relative to the seat base between an upright position and a reclined position; and
    a foot rest positioned vehicle-upward of the inclined portion of the floor and having an upper support surface configured to support the feet of an occupant of the seating assembly, wherein the foot rest is at least one of positioned within the foot well and at least partially defining the foot well, and the upper support surface of the foot rest is substantially parallel with the base portion of the floor in a foot rest use position of the foot rest.

2. The vehicle of claim 1, wherein the floor further comprises:
    a shelf portion extending vehicle-forward from the inclined portion, wherein the foot rest comprises the shelf portion.

3. The vehicle of claim 1, wherein the foot rest is operable to pivot within the foot well between a foot rest stowed position and the foot rest use position.

4. The vehicle of claim 3, wherein the upper support surface of the foot rest faces vehicle-forward in the foot rest stowed position and vehicle-upward in the foot rest use position.

5. The vehicle of claim 4, wherein a portion of the floor vehicle-upward and vehicle-forward of the base portion defines a foot rest recess, and wherein the foot rest is at least partially received within the foot rest recess in the foot rest stowed position.

6. The vehicle of claim 3, wherein the upper support surface of the foot rest faces vehicle-rearward in the foot rest stowed position and vehicle-upward in the foot rest use position.

7. The vehicle of claim 1, further comprising:
a foot pedal within the foot well and operable between a foot pedal use position and a foot pedal stowed position.

8. The vehicle of claim 7, wherein the foot pedal is vehicle-downward of the foot rest in the foot pedal stowed position.

9. The vehicle of claim 7, wherein the foot pedal is vehicle-upward of the foot rest in the foot pedal stowed position.

10. The vehicle of claim 7, wherein the foot pedal is operable to pivot between the foot pedal use and stowed positions, and the foot rest is operable to pivot between the foot rest use and stowed positions.

11. A vehicle, comprising:
a dashboard;
a foot well beneath the dashboard;
a foot rest having an upper support surface for supporting a foot of a user, the foot rest being positioned beneath the dashboard and operable to pivot between a foot rest use position and a foot rest stowed position, wherein the foot rest extends further in a vehicle-rearward direction in the foot rest use position than in the foot rest stowed position; and
a floor having a base portion that is substantially parallel to the upper support surface of the foot rest in the foot rest use position.

12. The vehicle of claim 11, wherein the upper support surface of the foot rest faces vehicle-forward in the foot rest stowed position and vehicle-upward in the foot rest use position.

13. The vehicle of claim 11, wherein the upper support surface of the foot rest faces vehicle-rearward in the foot rest stowed position and vehicle-upward in the foot rest use position.

14. The vehicle of claim 11, further comprising:
a seating assembly that corresponds with the foot well, comprising:
a seat base having an upper seat base surface; and
a seatback that is pivotable relative to the seat base between an upright position and a reclined position, wherein, in the foot rest use position of the foot rest and the reclined position of the seatback, the seating assembly and foot rest provide support for the user in a supine position.

15. A vehicle, comprising:
a dashboard having an underside that extends over a foot well; and
a floor, comprising:
a base portion of the floor;
an inclined portion of the floor within the foot well that extends vehicle-upward and vehicle-forward from the base portion of the floor beneath the dashboard; and
a shelf portion of the floor that extends vehicle-forward from the inclined portion of the floor to form a foot rest, wherein the shelf portion of the floor is substantially parallel with the base portion of the floor.

16. The vehicle of claim 15, further comprising:
a seating assembly that corresponds with the foot well, comprising:
a seat base having an upper seat base surface positioned to support a seated occupant, wherein the upper seat base surface is positioned vehicle-downward of the underside of the dashboard; and
a seatback operable to pivot relative to the seat base between an upright position and a reclined position.

17. The vehicle of claim 16, further comprising:
a brake pedal positioned within the foot well; and
an accelerator pedal positioned within the foot well.

18. The vehicle of claim 17, wherein the shelf portion extends vehicle-laterally-inboard from a laterally-outboard end to a laterally-inboard end, wherein the brake and accelerator pedals are vehicle-laterally-inboard of the laterally-outboard end and vehicle-laterally-outboard of the laterally-inboard end.

* * * * *